United States Patent
Perry et al.

(10) Patent No.: US 9,965,253 B2
(45) Date of Patent: May 8, 2018

(54) METHODS AND SYSTEMS FOR GENERATION AND EXECUTION OF MINIAPP OF COMPUTER APPLICATION SERVED BY CLOUD COMPUTING SYSTEM

(71) Applicant: Sony Interactive Entertainment America LLC, San Mateo, CA (US)

(72) Inventors: David Perry, Monarch Beach, CA (US); Victor Octave Suba Miura, Foster City, CA (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 0 days. days.

(21) Appl. No.: 15/163,630

(22) Filed: May 24, 2016

(65) Prior Publication Data
US 2016/0328214 A1   Nov. 10, 2016

Related U.S. Application Data

(63) Continuation of application No. 13/767,813, filed on Feb. 14, 2013, now Pat. No. 9,350,787, and a continuation-in-part of application No. 12/826,130, filed on Jun. 29, 2010, now Pat. No. 8,968,087, and a continuation-in-part of application No. 12/791,819, filed on Jun. 1, 2010, now Pat. No. 9,584,575.

(60) Provisional application No. 61/746,461, filed on Dec. 27, 2012, provisional application No. 61/354,699, filed on Jun. 14, 2010, provisional application No. 61/183,035, filed on Jun. 1, 2009, provisional (Continued)

(51) Int. Cl.
*A63F 9/24* (2006.01)
*G06F 9/44* (2018.01)
*H04L 29/08* (2006.01)
*A63F 13/88* (2014.01)
*A63F 13/335* (2014.01)
*A63F 13/30* (2014.01)
*H04N 21/241* (2011.01)
*H04N 21/478* (2011.01)
*A63F 13/40* (2014.01)
*A63F 13/5375* (2014.01)

(52) U.S. Cl.
CPC ............. *G06F 8/30* (2013.01); *A63F 13/10* (2013.01); *A63F 13/12* (2013.01); *A63F 13/335* (2014.09); *A63F 13/88* (2014.09); *H04L 67/02* (2013.01); *H04N 21/241* (2013.01); *H04N 21/4781* (2013.01); *A63F 13/5375* (2014.09); *A63F 2300/513* (2013.01)

(58) Field of Classification Search
CPC ................................. A63F 13/335; G06F 8/30
See application file for complete search history.

(56) References Cited

U.S. PATENT DOCUMENTS

2010/0166056 A1   7/2010   Perlman et al.

*Primary Examiner* — Steve Rowland
(74) *Attorney, Agent, or Firm* — Martine Penilla Group, LLP

(57) ABSTRACT

A first application is executed on a cloud computing system for a first period of time. User input signals associated with execution of the first application during the first period of time are recorded. A second application is generated to correspond to a portion of the first application as executed during a second period of time within the first period of time. The second application is defined by program instructions of the first application executed during the second period of time. A miniapp is generated to include the second application and the user input signals recorded during execution of the first application during the second period of time.

20 Claims, 14 Drawing Sheets

Related U.S. Application Data application No. 61/183,037, filed on Jun. 1, 2009, provisional application No. 61/183,088, filed on Jun. 2, 2009, provisional application No. 61/183,546, filed on Jun. 2, 2009, provisional application No. 61/323,354, filed on Apr. 12, 2010, provisional application No. 61/345,534, filed on May 17, 2010.

METHODS AND SYSTEMS FOR GENERATION AND EXECUTION OF MINIAPP OF COMPUTER APPLICATION SERVED BY CLOUD COMPUTING SYSTEM

CLAIM OF PRIORITY

This application is a continuation application under 35 U.S.C. 120 of prior U.S. application Ser. No. 13/767,813, filed Feb. 14, 2013, and issued as U.S. Pat. No. 9,350,787, on May 24, 2016, which:
1. claims priority under 35 U.S.C. 119(e) to U.S. Provisional Patent Application No. 61/746,461, filed Dec. 27, 2012, and
2. is a continuation-in-part application under 35 U.S.C. 120 of prior U.S. patent application Ser. No. 12/826,130, filed Jun. 29, 2010, issued as U.S. Pat. No. 8,968,087, on Mar. 3, 2015, which:
    1) claims priority to U.S. Provisional Patent Application No. 61/354,699, filed Jun. 14, 2010, and
    2) is a continuation-in-part of U.S. patent application Ser. No. 12/791,819, filed Jun. 1, 2010, which claims priority to each of the following U.S. Provisional Patent Applications Nos.:
        61/183,035, filed Jun. 1, 2009,
        61/183,037, filed Jun. 1, 2009,
        61/183,088, filed Jun. 2, 2009,
        61/183,546, filed Jun. 2, 2009,
        61/323,354, filed Apr. 12, 2010, and
        61/345,534, filed May 17, 2010.

Each above-identified U.S. Patent, U.S. Patent Application, and U.S. Provisional Patent Application is incorporated herein by reference in its entirety.

This application is also related to the following U.S. Patent Applications:
    Ser. No. 12/790,948, filed May 31, 2010, and
    Ser. No. 12/790,955, filed May 31, 2010.

Each of the above-identified U.S. Patent Applications is incorporated herein by reference in its entirety.

BACKGROUND

There are several models for the execution and rendering of video games. In the most simple model a game is executed and rendered on a computing device local to a player of the game. In another model a game state is maintained at a central server and communicated over a computing network to a client where rendering of video takes place. This model is commonly used by multi-player games in which the game state is dependent on inputs received over the computing network from multiple players of the game. In a third model a game state is maintained at a central server that also renders video for delivery to clients over a computing network as a video stream.

SUMMARY

In one embodiment, a method is disclosed for generating a miniapp. The method includes executing a first application on a cloud computing system for a period of time. The method also includes recording user input signals associated with execution of the first application during the period of time. The method also includes recording executable instructions and state data of the first application executed during the period of time. The method also includes generating a second application to correspond to one or more parts of the first application that was executed during a portion of the period of time. The second application is defined by executable instructions and state data of the first application as recorded during the portion of the period of time. The method further includes generating a miniapp to include the second application and the user input signals recorded during execution of the first application during the portion of the period of time.

In one embodiment, a miniapp system is disclosed. The miniapp system includes a miniapp generation module defined to generate a miniapp as a subset of program instructions of a first application and a set of user input signals and application state data received during execution of the subset of program instructions of the first application. The miniapp system also includes a miniapp publication module defined to provide for publication of a link to the miniapp, which upon activation will initiate auto execution of the subset of program instructions of the first application based upon the set of user input signals and application state data within the miniapp. The miniapp system further includes a miniapp execution module defined to provide for execution of the subset of program instructions of the first application based upon a new set of user input signals.

In one embodiment, a data storage device having program instruction stored thereon for generating a miniapp is disclosed. The data storage device includes program instructions for executing a first application on a cloud computing system for a period of time. The data storage device also includes program instructions for recording user input signals associated with execution of the first application during the period of time. The data storage device also includes program instructions for recording executable instructions and state data of the first application executed during the period of time. The data storage device also includes program instructions for generating a second application to correspond to one or more parts of the first application that was executed during a portion of the period of time. The second application is defined by executable instructions and state data of the first application as recorded during the portion of the period of time. The data storage device further includes program instructions for generating a miniapp to include the second application and the user input signals recorded during execution of the first application during the portion of the period of time.

Other aspects of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

A computer application is served from a remote computing platform, such as a virtual machine executing on a cloud computing system. A miniapp module executing on the remote computing platform is defined to provide miniapp-related graphical user interface elements and corresponding functionality within display frames of the computer application transmitted over a network to a user. The miniapp module provides a user-activatable element by which a portion of the execution history of the computer application can be saved as a miniapp clip. The miniapp module further provides for posting of the miniapp clip to a web site, such as a social media web site. The miniapp clip includes, without limitation, 1) a recording of the portion of the computer application execution history, and 2) an indexing of a portion of the computer application functionality associated with the recorded portion of the computer application execution history. Activation of the miniapp clip through the web site to which it is posted provides for, without limitation, 1) viewing of the recorded portion of the computer application execution history, 2) new execution of the indexed portion of the computer application, 3) recording of the new execution of the indexed computer application as an additional miniapp clip, 4) displaying controls to provide for purchase of the full computer application, and 5) displaying controls to provide for selection and purchase of an extended portion of the computer application functionality beyond that shown in the miniapp clip.

Figure 1:
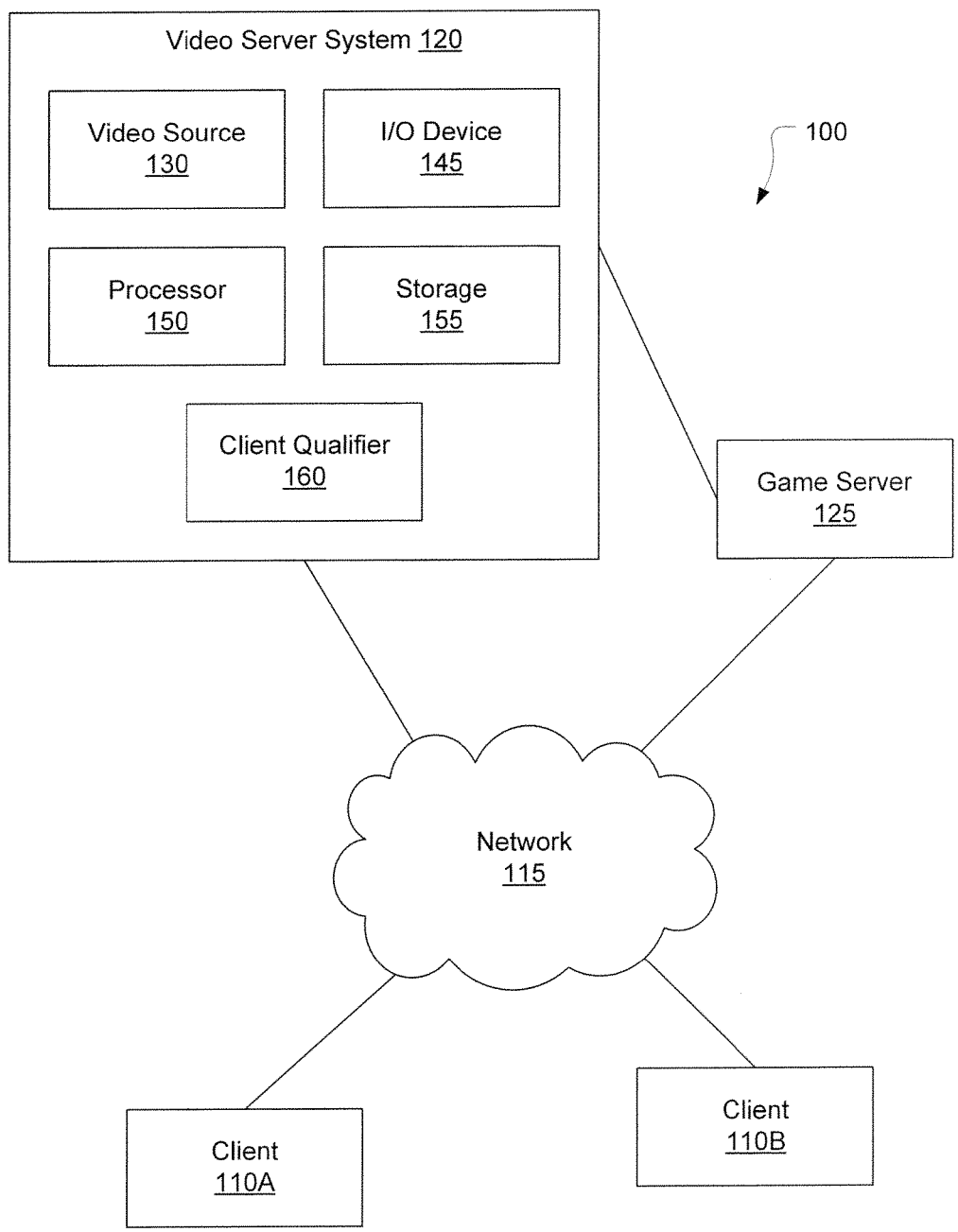
FIG. 1 is a block diagram of a game system, according to various embodiments of the invention.

FIG. 1 is a block diagram of a game system 100, according to various embodiments of the invention. The game system 100 is configured to provide a video stream to one or more clients 110, separately numbered 110A, 110B, etc. by way of example, via a network 115. The game system 100 typically includes a video server system 120 and an optional game server 125. The video server system 120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second, although higher or lower frame rates are included in alternative embodiments of the invention.

The clients 110, i.e., 110A, 110B, etc., may include terminals, personal computers, game consoles, tablet computers, telephones, set top boxes, kiosks, wireless devices, digital pads, stand-alone devices, handheld game playing devices, and/or the like. Typically, the clients 110 are configured to receive encoded video streams, decode the video streams, and present the resulting video to a user, e.g., a player of a game. The processes of receiving encoded video streams and/or decoding the video streams typically include storing individual video frames in a receive buffer of the client 110. The video streams may be presented to the user on a display integral to the client 110 or on a separate device such as a monitor or television.

The clients 110 are configured to receive video streams via the network 115. The network 115 may be any type of communication network, including a telephone network, the Internet, wireless networks, powerline networks, local area networks, wide area networks, private networks, and/or the like. In some embodiments, the video streams are communicated via standard protocols, such as TCP/IP or UDP/IP. Alternatively, the video streams can be communicated via proprietary standards.

A typical example of the clients 110 is a personal computer including a processor, non-volatile memory, a display, decoding logic, network communication capabilities, and input devices. The decoding logic may include hardware, firmware, and/or software stored on a computer readable medium, i.e., on a non-transitory data storage device. Systems for decoding (and encoding) video streams are well known in the art and vary depending on the particular encoding scheme used.

The video stream (and optionally audio stream) received by the clients 110 is generated and provided by the video server system 120. The video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g., to effect, the images shown to the user through rendering of the frame information in a visual display. Most of the disclosure provided herein with regard to "video frames" can also be applied to "audio frames."

The clients 110 are typically configured to receive inputs from a user. These inputs may include game commands configured to change the state of the video game or otherwise affect game play. The game commands can be received using input devices and/or may be automatically generated by computing instructions executing on the clients 110. Input devices of the clients 110 may include, for example, a keyboard, a joystick, a pointing device, a force feedback device, a motion and/or location sensing device, a mouse, a touch screen, a neural interface, a camera, input devices yet to be developed, and/or the like. The received game commands are communicated from the clients 110 via the network 115 to the video server system 120 and/or the game server 125.

The game server 125 can be optionally operated by a different entity than the video server system 120. For example, the game server 125 may be operated by the publisher of a multiplayer game. In this example, the video server system 120 is optionally viewed as a client by the game server 125 and optionally configured to appear from the point of view of the game server 125 to be a client executing a game engine. Communication between the video server system 120 and the game server 125 optionally occurs via the network 115. As such, the game server 125 can be a multiplayer game server that sends game state information to multiple clients, one of which is video server system 120.

The video server system 120 includes a video source 130, an I/O (input/output) device 145, a processor 150, and non-transitory data storage 155. The video server system 120 may include one computing device or be distributed among a plurality of computing devices. These computing devices are optionally connected via a communications system such as a local area network.

The video source 130 is configured to provide a video stream, e.g., streaming video or a series of video frames that form a moving picture. In some embodiments, the video source 130 includes a video game engine and rendering logic. The video game engine is configured to receive game commands from a player and to maintain a copy of the state of the video game based on the received commands. This game state includes the position of objects in a game environment, and may also include a point of view of the user. The game state may also include properties, images, colors and/or textures of objects. The game state is typically maintained based on game rules, as well as game commands such as move, turn, attack, set focus to, interact, use, and/or the like. Part of the game engine is optionally disposed within the game server 125. The game server 125 may maintain a copy of the state of the game based on game commands received from multiple players using geographically disperse clients. In these cases, the game state is provided by the game server 125 to the video source 130, where a copy of the game state is stored and rendering is performed. The game server 125 may receive game commands directly from clients 110 via the network 115, and/or may receive game commands via the video server system 120.

The video source 130 can include rendering logic, e.g., hardware, firmware, and/or software stored on a computer readable medium, such as the non-transitory data storage 155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to the clients 110. The encoding process produces a video stream that is optionally packaged for delivery to a decoder on a remote device. It should be understood that the encoding process can be implemented using essentially any encoding method.

The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. As used herein the term "frame size" is meant to refer to a number of pixels within a frame. The term "frame data size" is used to refer to a number of bytes required to store the frame.

The video source 130 is optionally configured to provide overlays configured to be placed on other video. For example, these overlays may include a command interface, log-in instructions, messages to a game player, images of other game players, video feeds of other game players (e.g., webcam video). In an example embodiment in which at least one of the clients 110 includes a touch screen interface, the overlay may include a virtual keyboard, joystick, touch pad, and/or the like. Also, in one example embodiment, an overlay of a player's voice is overlaid on an audio stream. The video source 130 may also include one or more audio sources.

In various embodiments, the I/O device 145 can be configured for the video server system 120 to send and/or receive information such as video, commands, requests for information, a game state, client identities, player identities, game commands, security information, audio, and/or the like. The I/O device 145 can include communication hardware such as a network card or modem. The I/O device 145 is configured to communicate with the game server 125, the network 115, and/or the clients 110.

The processor 150 is configured to execute logic, e.g., software, included within the various components of the video server system 120 discussed herein. For example, the processor 150 may be programmed with software instructions in order to perform the functions of the video source 130, the game server 125, and/or a client qualifier 160. The video server system 120 optionally includes more than one instance of the processor 150. The processor 150 may also be programmed with software instructions in order to execute commands received by the video server system 120, or to coordinate the operation of the various elements of the game system 100 discussed herein. The processor 150 may include one or more hardware devices. It should be understood that the processor 150 is an electronic processor, i.e., a computer processor.

The video server system 120 optionally includes the client qualifier 160 which is configured to remotely determine the capabilities of the clients 110. These capabilities can include both the capabilities of a given client 110 itself, and the capabilities of one or more communication channels between the given client 110 and the video server system 120. For example, the client qualifier 160 may be configured to test a communication channel through the network 115.

Figure 2:
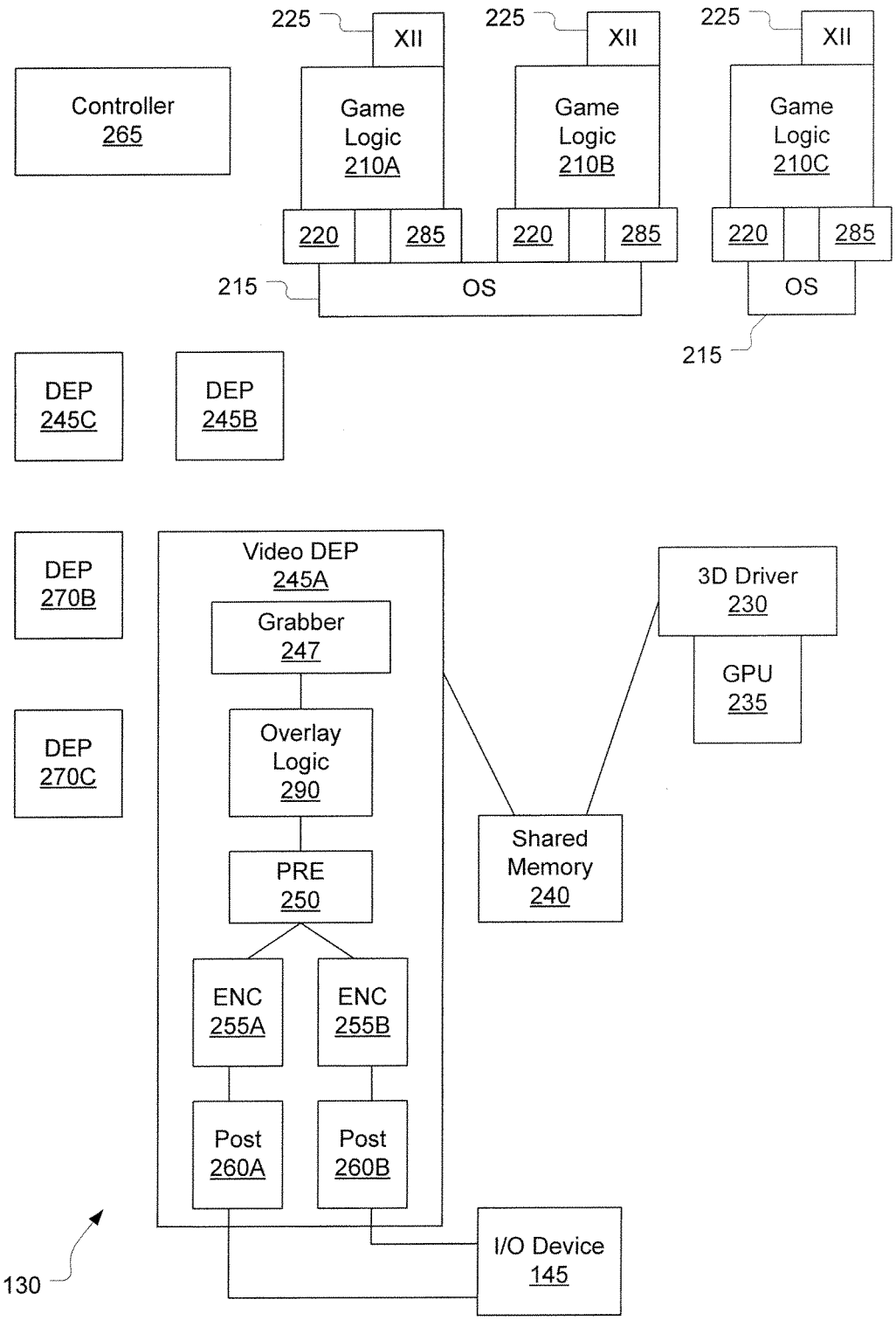
FIG. 2 is a block diagram of embodiments of the video source configured to serve multiple video games.

FIG. 2 is a block diagram of embodiments of the video source 130 configured to serve multiple video games. The multiple video games can include multiple instances of the same video game and/or instances of different video games. The video games are optionally multiplayer games. For example, a game state of one or more of the video games may be maintained by one or more instances of the game server 125, each based on inputs received from multiple clients 110.

The video games are executed using different instances of game logic 210, individually labeled 210A, 210B, 210C, etc. The game logic 210 is configured to use a game state to determine a game environment that can be rendered to a video stream configured to be presented to a game player. In some embodiments, the game environment is a three dimensional virtual environment including game objects, avatars, location of objects, their shapes, textures, and spatial relationships therebetween, and the like. A game environment can include vertex data, transformation data and texture data, and/or the like.

The rendering is typically based on one or more point of views associated with a specific game player. The video source 130 can include multiple instances of the game logic 210. The game logic 210 can optionally be a client of the game server 125 and may be configured to communicate with game server 125 via the network 115.

The game logic 210 is configured to receive game commands from one or more clients 110 and to process the received commands according to a set of game rules. These rules cover, for example, how avatars interact with other avatars or in game objects, avatar movement, game instance management, and/or the like. The game logic 210 includes hardware, firmware, and/or software stored on a computer readable medium.

Each instance of the game logic 210 can be disposed on a separate computing device, or several instances of the game logic 210 can be disposed on the same computing device, or a single instance of the game logic 210 can be disposed across multiple computing devices. Game instances can dynamically change the number and/or identify of computing devices used depending on the requirements of the game environment the user is currently experiencing. Instances of the game logic 210 disposed on the same computing device are optionally executed within separate virtual machines or virtual I/O shells. In some embodiments, different instances of the game logic 210 are configured to communicate game commands and/or game state information directly to each other, e.g., without necessarily communication through the game server 125.

The game logic 210 can execute on top of an operating system (OS) 215. The operating system 215 may include Windows™, Linux, Unix, Mac OS™, Solaris™, and/or the like. In some embodiments, the operating system 215 and game logic 210 can operate on one or more virtual machine platforms such as ESX, Hyper-V, and/or the like. In these embodiments, one or more instances of the game logic 210 can be executed within a virtual machine. Also, multiple instances of the game logic 210 may execute on the same instance of the operating system 210. For example, FIG. 2 shows the game logic 210A and the game logic 210B both executing on the same operating system 215. Multiple instances of game logic 210 executing on the same operation system 215 may, or may not, be configured for playing the same video game.

In some embodiments, the game environments determined by the game logic 210 are passed to an optional virtual 3D video driver 220. The virtual 3D video driver 220 is configured to appear, from the point of view of the game logic 210, as a non-virtual 3D video driver controlling a graphics processing unit. Each instance of the game logic 210 may be associated with its own instance of the virtual 3D video driver 220, or the virtual 3D video driver 220 may be shared by two or more instances of the game logic 210.

The virtual 3D video driver 220 is further configured to pass the received game environments to a (non-virtual) 3D driver 230. Optionally, the delivery of game environments to 3D driver 230 is coordinated by the various instances of the virtual 3D video driver 220. For example, delivery can be coordinated such that 3D driver 230 receives game environments from one (or a minimum number of) virtual 3D video driver 220 at a time. In some embodiments, each of the virtual 3D video drivers 220 is configured such that they appear to be a separate process and a separate source of video data to 3D driver 230. As such, 3D driver 230 is configured to keep track of which video data results in which video frames after rendering.

The video data received by 3D driver 230 are passed to graphics processing unit (GPU) 235 for rendering into raw video frames. The graphics processing unit 235 is optionally used to render more than one video stream in parallel. The parallel production of video streams includes the generation of these streams at the same time. However, parallel production of video streams may, but does not necessarily, include the processing of individual frames at the same time within the graphics processing unit 235. For example, in some embodiments 3D driver 230 alternatively passes the video data generated by the various members game logic 210 to the graphics processing unit 235. Data generated by game logic 210A is used to make a video frame, and subsequently data generated by game logic 210B is used to make a video frame, etc. In this case, the video streams are produced in parallel while individual frames are produced in series.

The virtual 3D video drivers 220 can be configured to manage the transfer of raw rendered video frames from 3D driver 230. For example, the virtual 3D drivers 220 may be used to coordinate the transfer of video frames from the control of 3D driver 230 to a shared memory 240. Following rendering, the video frames are in a memory of the graphics processing unit 235 or in a memory managed by the 3D driver 230. In either case, they are under the control of the 3D driver 230. As the virtual 3D video drivers 220 manage the communication of video data and frames to and from 3D driver 230, in some embodiments, they are capable of placing the video frames within parts of the shared memory 240 associated with specific video dynamic encoding pipelines (DEPs) 245. The video DEPs 245 are individually identified as video DEP 245A, DEP 245B, DEP 245C, etc. In some embodiments, each video DEP 245 is assigned specific memory locations within the shared memory 240, and is configured to retrieve video data from those memory locations.

The shared memory 240 includes random access memory (RAM) or a similar memory configured for efficient reading and writing of video data. The shared memory 240 is configured to store video data for a plurality of different video DEPs 245. Video data for different video DEPs 245 is optionally stored at the same time in shared memory 240. The shared memory 240 may consist of a single hardware device or may include multiple devices.

The video DEPs 245 are dynamically allocated encoding pipelines that are each configured to encode video data rendered using the graphics processing unit 235. Each member of video DEPs 245 is configured to encode to video formats specified at the time the video DEP 245 is provisioned. This format specification is typically based on the needs of one of clients 110 and/or the capabilities of the communication path between the video server system 120 and the client 110. The video DEPs 245 are optionally provisioned dynamically in response from a request from one of clients 110. A member of video DEPs 245 can optionally be configured to use more than one encoding scheme.

Each video DEP 245 includes a grabber 247 configured to grab video data from the shared memory 240 and transfer this video data to a memory of the video DEP 245. Each video DEP 245 optionally includes a preprocessor (PRE) 250 configured to perform a color space conversion such as RGB to YUV and/or a scaling operation to increase or decrease the resolution of the video frame. The preprocessor 250 is optional in embodiments wherein the output of the graphics processing unit 235 is in the YUV color space or some other desired color space. Multiple preprocessors 250 may be included in a video DEP 245 configured to produce multiple video streams having video frames of different sizes. Each video DEP 245 includes at least one encoder (ENC) 255. By way of example in FIG. 2, encoders 255 are individually identified as encoder 255A, encoder 255B, etc. Each encoders 255 is configured to encode the video data according to a specific codec, and optionally a specific color depth and/or frame size.

In some embodiments, video DEPs 245 are configured to use two or more different encoders to generate two or more different video streams at the same time. These video streams are based on the same game environment rendered by the graphics processing unit 255 and, thus, include essentially the same materials (with the possible exception of overlays) and can be sent to different places. For example, one of the video streams can be sent to the client 110A while the other is sent to the client 110B. Alternatively, one of the video streams can be sent to the client 110A and the other to a website where third parties can watch the video. This website is optionally part of a social networking site or a game player's site. The two different video streams may be different in the frame rate, encoding type, frame size, color depth, etc. For example a video stream delivered to a social networking website can be of much lower quality than the video stream delivered to a game player who is playing a game using the client 110A. The second video stream may be directed to a game player who is playing the game or to people who are merely observing the game play. A video stream is optionally directed to more than one place.

The video DEP 245A can optionally include one or more post processors (Post) 260. Individual examples of post processors 260 are labeled 260A and 260B. The post processors 260 are configured to package an encoded video frame in a container in a format appropriate for communication over a network according to a public or proprietary network protocol. For example, some protocols such as Adobe RTMP require post processing while other video standards such as H.264 Annex B do not require post processing. Each of the post processors 260 may be associated with a specific member of encoders 255, or several post processors 260 may be configured to receive encoded video frames from one member of encoders 255.

The output of post processors 260 is directed to I/O Device 145 for delivery to one or more of the clients 110.

The elements of video DEPs 245 discussed herein include hardware, firmware and/or software stored on a computer readable medium. For example, each of the video DEPs 245 may represent a set of software loaded into memory and executing using an electronic processor.

The operation of the video source 130 is typically managed by a controller 265. The controller 265 includes hardware, firmware and/or software stored on a computer readable medium. For example, the controller 265 may include software stored in memory and executed using a microprocessor.

Figure 3:
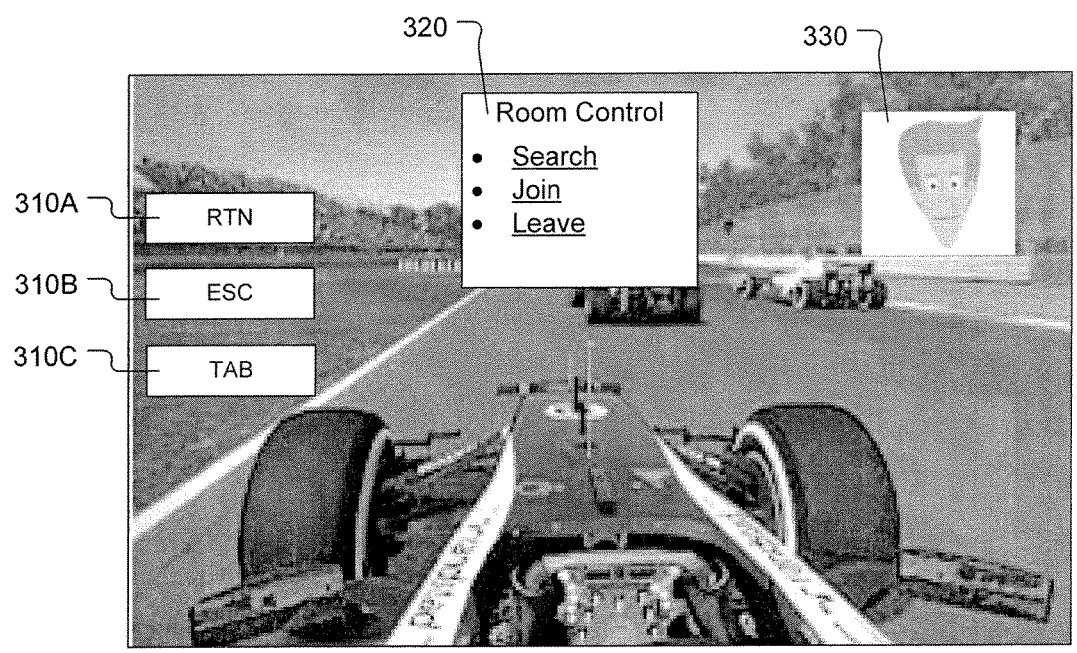
FIG. 3 shows overlays on game video (a video frame), according to various embodiments of the invention.

FIG. 3 shows overlays on game video (a video frame), according to various embodiments of the invention. Three overlays 310A, 310B, and 310C (collectively identified as overlays 310) have been applied to the video generated by the video game. These overlays 310 may be applied as a single overlay or as several separate overlays.

In one example embodiment, each of the overlays 310 represents a different game control input as indicated by the text therein. Overlay 310A represents a carriage return, overlay 310B represents an escape key, and overlay 310C represents a tab key. It should be appreciated that in other embodiments, the overlays 810 can identify controller commands. For example, the overlays 810A, 810B, and 810C, may show icons for different game controller actions (e.g., button press, stick movement, tilt direction, shake, etc.) with a corresponding descriptive action term. In some embodiments, these overlays 310 are associated with specific regions of the video frame and these specific regions are mapped to the represented game control input. For example, the region of the image occupied by overlay 310C is mapped to the tab key such that clicking on or otherwise making a selection in this region is interpreted as a tab keystroke. Selection can be accomplished by using a pointing device such as a joystick or mouse, or by touching this region on a touch sensitive screen.

FIG. 3 further includes an overlay 320 representing a game menu, such as may be used to manage a game room or other aspect of game execution. Overlay 320 includes a plurality of active regions mapped to different game commands (inputs). For example, the area occupied by the word "search" within overlay 320 is mapped to a search command while the area occupied by the word "join" is mapped to a command to join a game room.

FIG. 3 further includes an overlay 330 including an image of a game player. Overlay 330 may be a static or real-time image of another game player. For example, if the video frame illustrated in FIG. 3 is to be sent to client 110A, then overlay 330 may include a real-time video frame of a player of client 110B. The overlay 330 may alternatively include a view of the video game from another player's point of view, a view from a second point of view for a same player, or a view of some real-life event. In one example, overlay 330 includes a video frame based on a second point of view of the same player whose first point of view was used to generate the underlying image. This second point of view can be generated using a second video DEP 245. The number, shape, size, and characteristics of overlays that may be placed over video data can vary widely. Overlays may or may not be mapped to game commands. Overlays can be applied either server and/or client side. Some embodiments include overlays applied both server and client side.

The mapping of user inputs to game commands is not limited to applications in which clients 110 include a touch screen or pointing device. The mapping of user inputs to specific game commands can occur at clients 110 or at video server system 120. For example, the iPad® from Apple Computer, Inc. is configured to convert touches to its screen, movements, and combinations of touches to specific commands. The iPad® and iPhone® are also configured to convert movements of the device itself to specific commands. However, other types of clients 110 may not have these capabilities, in which case the mapping can occur at video server system 120.

Figure 4:
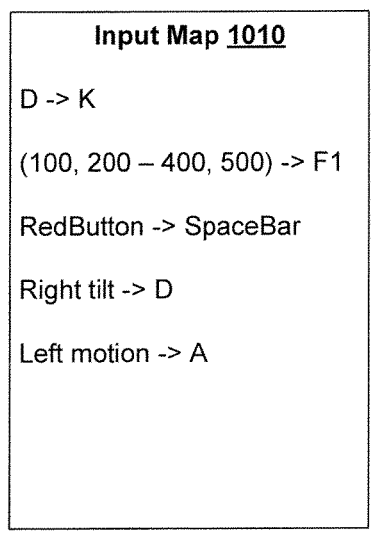
FIG. 4 shows part of an input map configured for mapping of user inputs to game commands, according to various embodiments of the invention.

Mapping of user inputs to game commands is optionally performed using a look-up table or other type of input mapping. FIG. 4 shows part of an input map 1010 configured for mapping of user inputs to game commands, according to various embodiments of the invention. It should be understood that an input map 1010 for command mapping can include more or less entries than shown in FIG. 4.

The first mapping shown in input map 1010 is a direct character to character map of "D" to "K." This type of mapping may be useful in games that are configured for several players to share a keyboard, each using their own subset of the keys, by way of example. When such a game is played by geographically disperse game players, each player may use the same keys but one of the player's inputs are mapped to a different part of the keyboard.

The second mapping shown in input map 1010 includes mapping of a screen area to a key. Specifically, a rectangle with corners at (100, 200) and (400, 500) is mapped to the F1 function key. The coordinates can be in image, window, or screen pixels. This type of mapping is useful when a touch screen or pointing device is used as an input. This type of mapping can be used to map images within an overlay to specific game commands. This type of mapping can also be dependent on movement of a finger or cursor on a screen, or the number of points at which a touch screen is touched.

The third type of mapping shown in input map 1010 includes mapping of a controller button to a key. Specifically, a "Redbutton" is mapped to a "Spacebar." This type of mapping can be used to map game controller inputs to specific game commands. It should be understood that in some embodiments of the present invention, a game controller, and any function thereof (e.g., button, stick, tilt, shake, etc.), can be mapped to a corresponding game command.

The fourth type of mapping shown in input map 1010 includes mapping motion ("Right Tilt") of an input device to a key. This type of mapping can be used with joysticks, iPhones®, iPads®, the Nintendo Wii®, or other type of clients 110 with motion or location sensing capabilities.

The fifth type of mapping shown in input map 1010 includes mapping of a movement of an object as detected by an external device, such as a camera, to a key "A." This type of mapping is optionally used in clients 110 that include radio or video motion detection systems. Using this type of mapping allows games designed to be played using a keyboard to be played using new types of input devices, such as the Kinect® from Microsoft.

A sixth type of mapping may be dynamic. For example, in embodiments where motion of a finger on a touch screen is mapped to joystick movements, where the finger first touches the screen may be dynamically mapped to the joystick "center" position. Screen positions just above, below, right, left, etc., of the first touch position are mapped to joystick positions up, down, left, right, etc., respectively. As such, a joystick movement can be entered by first placing a finger on the screen and then sliding the finger in some direction. Dynamic mapping may also include multi-finger touches to the screen. For example, a touch on a first point of the screen can determine the location and orientation of a mapping used to convert a second touch to a game command.

Figure 5:
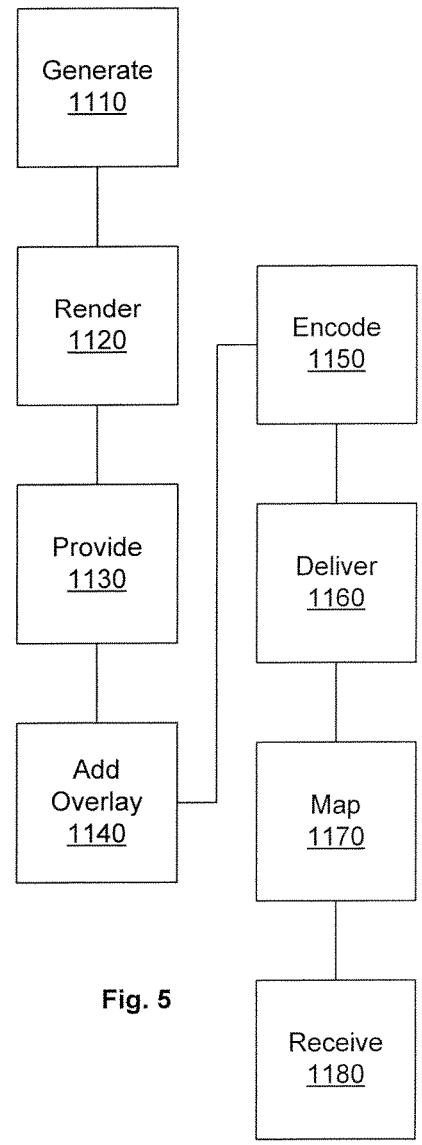
FIG. 5 shows methods of using an overlay, according to various embodiments of the invention.

FIG. 5 shows methods of using an overlay, according to various embodiments of the invention. The overlay can be audio or video. In the method of FIG. 5, a video frame is generated using graphics processing unit 235 and an overlay is added to this video frame prior to encoding. The method operations shown in FIG. 5 can optionally be performed in parallel using several of game logic 210, several of video DEP 245 and/or several of audio DEP 270.

Specifically, in a Generate Step 1110, a game environment is generated based on game rules and game commands received via Network 115 and clients 110 from one or more game players. For example, a game player at client 110A and a game player at client 110B may each provide a game command that is used to update a game state from which the game environment is generated. Generate Step 1110 may include Receive State Step 515 and Determine 3D Data Step 520, as discussed with regard to FIG. 4. In some embodiments, Generate Step 1110 includes generating audio data based on events within the game, the game rules, and/or received game commands.

In an optional Render Step 1120, the game environment generated in Generate Step 1110 is rendered using graphical processing unit 235. Render Step 1120 is an embodiment of Render Step 525 discussed with regard to FIG. 4. The result of Render Step 1120 is a video frame. Render Step 1120 is optional in embodiments where the result of Generate Step 1110 includes only audio data and/or does not include a 3D game environment.

In a Provide Step 1130, the video frame generated in Render Step 1120 and/or the audio data generated in Generate Step 1110 is provided to one or more encoding pipelines, such as video DEP 245A and/or audio DEP 270A. For example, a video frame may be provided to video DEP 245A while an audio frame is provided to audio DEP 270A. Provide Step 1130 is an embodiment of Transfer Step 527 as discussed with regard to FIG. 4.

In an Add Overlay Step 1140, a video overlay is added to the video frame provided in Provide Step 1130, and/or an audio overlay is added to audio data provided in Provide Step 1130. Add Overlay Step 1140 is typically performed using Overlay Logic 290 and/or Overlay Logic 295 as discussed with regard to FIG. 2. More than one video overlay and more than one audio overlay are optionally added in Add Overlay Step 1140. The audio overlay optionally includes audio data received from one or more of clients 110 as packets via network 115. For example, the audio overlay can include voice data of game players received from multiple clients 110.

In some embodiments, video source 130 receives audio data from many clients 110, and the Add Overlay Step 1140 includes determining which of the audio data should be used in a particular audio overlay. For example, while 10 game players may be using video source 130, only the voice data of two or three of these players may be included in the audio overlay. The determination of which audio data to include in an overlay is optionally based on a social relationship between game players. For example, one game player may select which, i.e., whose, voice data he wishes to receive. The social relationships can include membership in a guild, party, being in a same battleground, or game instance, and/or having avatars located near each other in the same game environment, among others. In some embodiments, the volume of audio data is adjusted responsive to an in-game distance between two avatars.

In an Encode Step 1150, the video frame and/or audio data, as well as any overlays are encoded. This can be accomplished using encoder 255 and/or audio encoder 280. Encode Step 1150 is an embodiment of Encode Step 535. Encode Step 1150 may be performed before or after Add Overlay Step 1150.

In a Deliver Step 1160, the video frame and/or audio data encoded in Encode Step 1150 is provided to one of clients 110 via network 115. The video frame and/or audio data are optionally provided to more than one location. For example, the same data can be provided to more than one game player. Deliver Step 1160 is an embodiment of Provide Step 545 discussed with regard to FIG. 4.

In an optional Map Step 1170, part of a video overlay applied in Add Overlay Step 1140 is mapped to a game command. For example, a region of the video frame to which the video overlay was added can be set in a input map 1010 as mapping to a specific game command. An overlay can be applied to more than one region of a display or a video frame. Each region is optionally mapped to a different game command. The input map 1010 can be located on video server system 120 or one of clients 110.

In an optional Receive Step 1180, a mapped game command is received at or within video source 130. The mapped game command is optionally a command that has been mapped from a region of a video frame to which an overlay was applied. The received game command may have been mapped at either one of clients 110 or at video server system 120. The received game command is optionally used to update a state of the video game.

Figure 6:
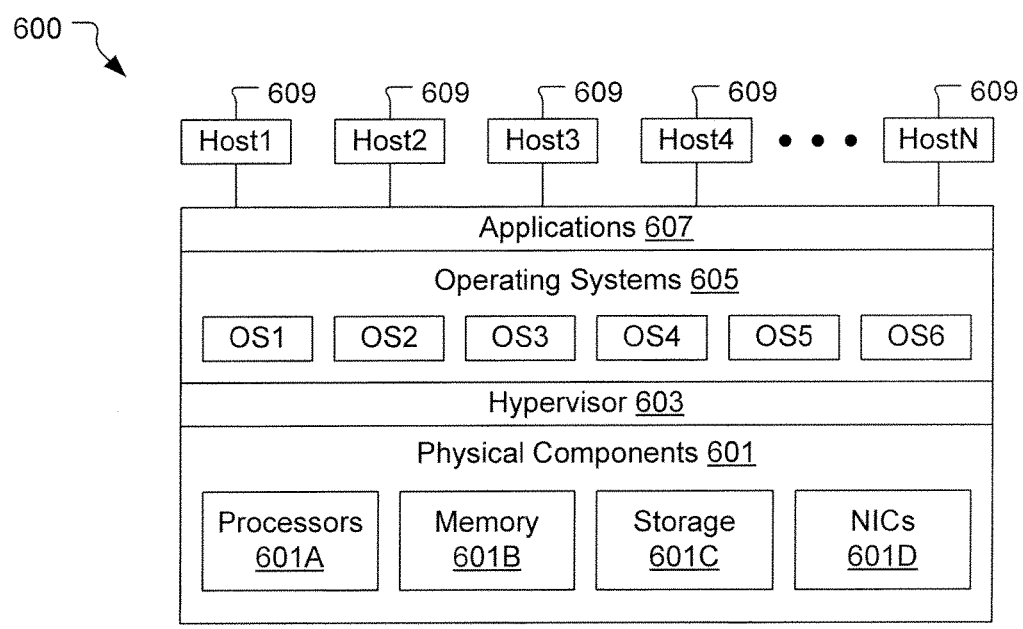
FIG. 6 shows a diagram of a cloud computing system for generation and execution of a remotely served computer application and of a miniapp of a remotely served computer application, in accordance with one embodiment of the present invention.

FIG. 6 shows a diagram of a cloud computing system 600 for generation and execution of a remotely served computer application and of a miniapp of a remotely served computer application, in accordance with one embodiment of the present invention. The cloud computing system 600 includes various physical components 601, i.e., computing hardware components, defined to perform the operations necessary for computing activity. The physical components 601 can include a number of computer processors 601A, an amount of computer memory 601B, an amount of persistent data storage 601C, and a number of network interface cards/chips (NICs) 601D. The various physical components 601 mentioned above may correspond to any such physical component 601 known in the art. Also, it should be understood that the various physical components 601 mentioned above are provided by way of example. Various embodiments of the cloud computing system 600 can include more or less physical components 601 than the examples mentioned above, and can include physical components 601 not mentioned above, e.g., power supplies, cooling systems, etc., so long as the integrated computing capabilities of the physical components 601 are adequate to ensure proper performance of the cloud computing system 600.

The cloud computing system 600 also includes a hypervisor 603, or similar control layer, that is defined to generate and execute a number of virtual machines using the various physical components 601. Each virtual machine that is generated and executed by the hypervisor 603 is essentially a software emulation of a particular computing architecture. Using the various physical components 601, the hypervisor 603 can simultaneously generate and execute multiple different virtual machines. A given virtual machine can be directed to operate in accordance with one or more of a number of operating systems 605 corresponding to the particular computing architecture emulated by the given virtual machine. Examples of various types of operating systems include Windows, Mac OS X, Linux, Play Station 1 (PS1), Play Station 2 (PS2), Play Station 3 (PS3), among others. For example, with regard to FIG. 6, if the operating system OS1 is the PS3 operating system, then OS1 can be executed on a virtual machine generated by the hypervisor 603 to emulate the PS3 computing architecture. Similarly, if the operating system OS5 is a Mac OS X operating system, then OS5 can be executed on a virtual machine generated by the hypervisor 603 to emulate a Mac computing architecture.

In the manner described above, the hypervisor 603 can utilize the physical components 601 to generate and execute essentially any number of different types of virtual machines for emulating essentially any number of different types of computing architectures upon which various corresponding operating systems can be executed. Therefore, the cloud computing system 600 can provide an instance of essentially any computing system as defined by a particular operating system executing on its required computing architecture. While the example of FIG. 6, shows six operating systems OS1-OS6 by way of example, it should be understood that the cloud computing system 600 is not limited in any way to a set number of operating systems. The hypervisor 603 can be defined to generate a virtual machine for essentially any computing architecture imaginable so as to execute essentially any corresponding operating system imaginable. Therefore, it should be understood that the cloud computing system 600 is scalable with regard to physical components 601, hypervisor 603 capability (i.e., number and type of virtual machine emulation), and number and type of operating system provision.

The cloud computing system 600 also includes a number of different computer applications 607 defined for execution through one or more of the number of operating systems 605. The various computer applications 607 can be stored in the storage 601C of the cloud computing system 600, and can be loaded into memory 601B for execution as needed in conjunction with provision of a given instance of a particular virtual machine and corresponding operating system by the hypervisor 603. It should be understood that any computer application 607 that exists for any operating system 605 can be executed by the cloud computing system 600.

FIG. 6 also shows a number of hosts 609 (Host1-HostN). The hosts 609 represent an instance of a user having accessed the cloud computing system 600 to obtain access to an instance of a particular virtual machine and corresponding operating system in order to execute a selected application 607. It should be understood that the cloud computing system 600 can be defined and managed to provision virtual machines and operating systems in many different ways. For example, in some cases, each user accessing the cloud computing system 600 can be provided with a dedicated virtual machine and corresponding operating system upon which the user can execute a desired application 607. Also, in some cases, multiple users accessing the cloud computing system 600 can be made to share a virtual machine and corresponding operating system upon which each user can execute their desired applications 607. Operation and management of the cloud computing system 600 can be optimized to provide each user accessing the cloud computing system 600 with the best quality of service possible given the available physical components 601.

In various embodiments, the cloud computing system 600 is a cloud gaming system. In one embodiment, the cloud gaming system is configured to detect the type of client device associated with the user, and also a type of controller available for the user to provide input to the cloud-based video game. For example, in one embodiment, when a user logs in to the cloud gaming system, they may be presented with an option to designate the type of client device with which they are accessing the cloud gaming system. In one embodiment, a series of client device options are presented from which the user may select one corresponding to their client device. The user may also be presented with an option to designate the type of controller device they will use to play a video game. In one embodiment, a series of controller options can be presented to the user, from which the user may select to designate a controller type corresponding to their controller hardware. In other embodiments, the cloud gaming system can be configured to automatically detect the client device type and/or the controller device type.

For example, at the time of login, the client device may send information to the cloud gaming server identifying itself as well as a connected controller device (e.g. in response to a request from the cloud gaming server). Based on this information, the cloud gaming server may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlayed during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud gaming server via a network (e.g. accessed via a local networking device such as a router). However, in other embodiments, the controller can itself be a networked device, with the ability to communicate inputs directly via the network to the cloud gaming server, without being required to communicate such inputs through the client device first. For example, the controller might connect to a local networking device (such as the aforementioned router) to send to and receive data from the cloud gaming server. Thus, while the client device may still be required to receive video output from the cloud-based video game and render it on a local display, input latency can be reduced by allowing the controller to send inputs directly over the network to the cloud gaming server, bypassing the client device.

In one embodiment, a networked controller and client device can be configured to send certain types of inputs directly from the controller to the cloud gaming server, and other types of inputs via the client device. For example, inputs whose detection does not depend on any additional hardware or processing apart from the controller itself can be sent directly from the controller to the cloud gaming server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud gaming server. These might include captured video or audio from the game environment that may be processed by the client device before sending to the cloud gaming server. Additionally, inputs from motion detection hardware of the controller might be processed by the client device in conjunction with captured video to detect the position and motion of the controller, which would subsequently be communicated by the client device to the cloud gaming server. It should be appreciated that the controller device in accordance with various embodiments may also receive data (e.g. feedback data) from the client device or directly from the cloud gaming server.

It should be understood that the cloud computing system 600 by way of example, or similar computing system, can provide a user with access to a remotely served computer application for execution through the user's computing terminal, so long as the user's computing terminal is capable of accessing the computing system 600 through a network, i.e., through either a wired network, a wireless network, or a combination thereof. In other words, the cloud computing system 600 allows a user to execute a computer application of their choosing on the cloud computing system 600 through the user's terminal, with the underlying hardware, operating system, and computer application provisioned by the cloud computing system 600.

Because the user-selected computer application resides on the cloud computing system 600 and is provisioned to the user on an as-needed basis, the user-selected computer application's manufacturer can provide supplemental computer applications on the cloud computing system 600 to execute in conjunction with the user-selected computer application in order to modify and/or augment a performance/behavior of the user-selected computer application as it appears to the user at the user's computing terminal. For example, a miniapp module can be provided as a computer application to be executed on the cloud computing system 600 to modify and/or augment a performance/behavior of the user-selected computer application as it appears to the user at the user's computing terminal.

The miniapp module is defined to provide the user with a capability to generate a miniapp, i.e., miniature computer application, of the computer application that the user is executing. For ease of description, the miniapp module and its associated functionality is described hereafter primarily within the context of video game computer application execution. However, it should be understood that the miniapp module and its associated functionality as described herein can be equally applied to any computer application, video game or not.

Within the example context of video game play, a miniapp module can be executed on the cloud computing system 600 for a video game that a user is playing on the cloud computing system 600. Using video overlay techniques as described herein, the miniapp module can provide a miniapp generation button (or other suitable graphical user interface (GUI) element), on the video frame sequence of the video game played by the user, with a corresponding input map for the miniapp generation button. Upon activation of the miniapp generation button by the user, the miniapp module provides the user with a set of miniapp generation tools represented as various GUI elements provided through video overlay with corresponding input maps. The user can then activate the set of miniapp generation tools to create a miniature version of the video game corresponding to a portion of the video game that the user has already executed, referred to hereafter as the miniapp.

The miniapp is defined by the actual program instructions that were executed and available for execution during the user's execution of the portion of the video game corresponding to the miniapp. The miniapp also includes a recording of input signals received from the user during the portion of the executed video game corresponding to the miniapp. In one embodiment, the miniapp also includes a sequence of video images rendered and recorded during the user's execution of the portion of the video game corresponding to the miniapp. In this embodiment, the recorded sequence of video images can be displayed to show the user's previous execution of the portion of the video game corresponding to the miniapp. In another embodiment, the program instructions of the miniapp can be executed based on the user's recorded input signals to effectively show a video playback of the user's execution of the video game, as applicable to the miniapp portion of the video game.

Also, because the miniapp is defined by the actual program instructions that were executed and available for execution during the miniapp portion of the video game, the miniapp is available for execution based on new user input signals. Thus, the miniapp allows its corresponding portion of the video game to be replayed by the same user or a different user at any time. And, by way of the cloud computing system 600, the generated miniapp can be stored and executed by essentially any user at any time. Additionally, the miniapp module can provide various GUI elements and corresponding input maps and video overlay to allow a user to publish a generated miniapp, such as to a social media web site, and/or to save a generated miniapp to a specified storage location, and/or to execute a generated miniapp.

Figure 7:
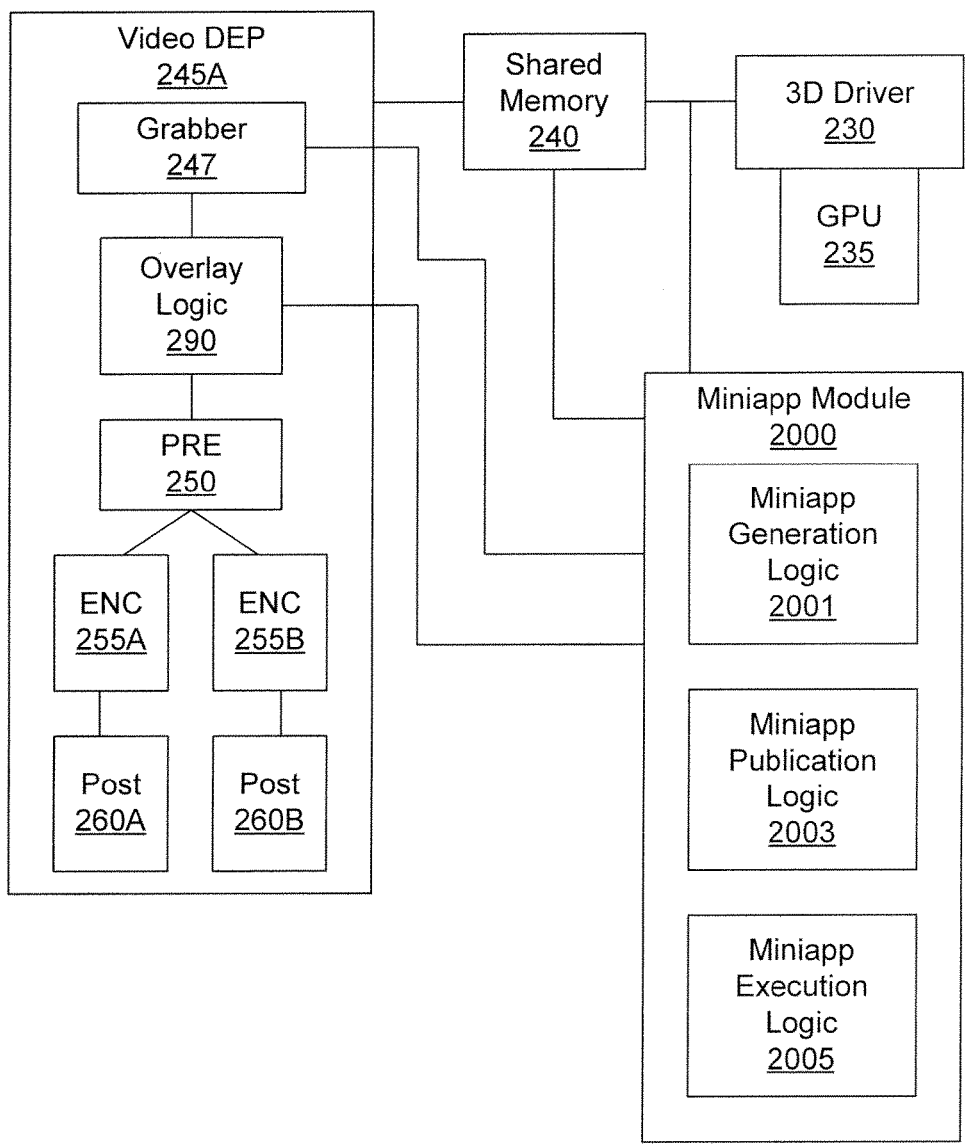
FIG. 7 shows a miniapp module interfaced with the video DEP 245A of FIG. 2, in accordance with one embodiment of the present invention.

FIG. 7 shows a miniapp module 2000 interfaced with the video DEP 245A of FIG. 2, in accordance with one embodiment of the present invention. The miniapp module 2000 is defined to generate and provide various video overlay images through the DEP 245A as necessary to effect functionality of the miniapp module 2000, in accordance with description of the video DEP 245A and overlay logic 290 provided with regard to FIG. 2. The miniapp module 2000 is also defined to provide input maps for the various video overlay images provided through the DEP 245A, in accordance with the description of FIGS. 4 and 5, to effect functionality of the miniapp module 2000.

Figure 8:
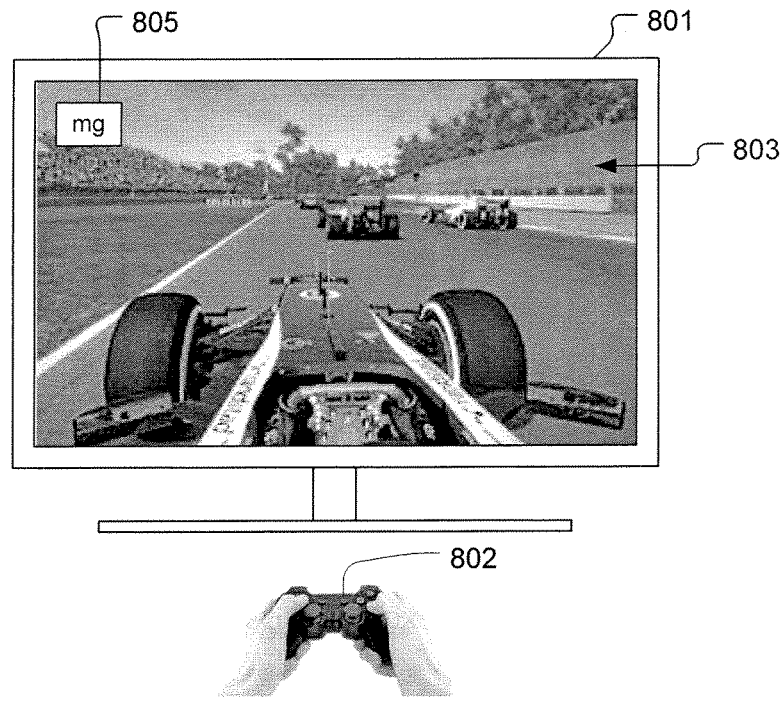
FIG. 8 shows a user terminal display upon which a video sequence of a video game is displayed.

The miniapp module 2000 includes miniapp generation logic 2001 defined to provide for generation of a miniapp based on a user's execution of a video game, or of a computer application in general. The miniapp generation logic 2001 is defined to provide a miniapp generation GUI button, or other suitable control, as a video overlay on the video game being executed by the user. For example, FIG. 8 shows a user terminal display 801 upon which a video sequence 803 of a video game is displayed. The user is executing the video game by providing user input signals through a controller 802, in response to the video sequence 803 shown in the display 801. A miniapp generation GUI button 805 is shown on display 801. The miniapp generation GUI button 805 can be shown by applying a video overlay on the video sequence 803. In one embodiment, the miniapp generation GUI button 805 is shown to persist in a fixed position on the screen. In another embodiment, the miniapp generation GUI button 805 can be displayed in response to a received user input signal, such as a menu selection signal, a controller 802 activation signal, a hovering of a virtual control element over a prescribed location on the screen, etc.

Figure 9:
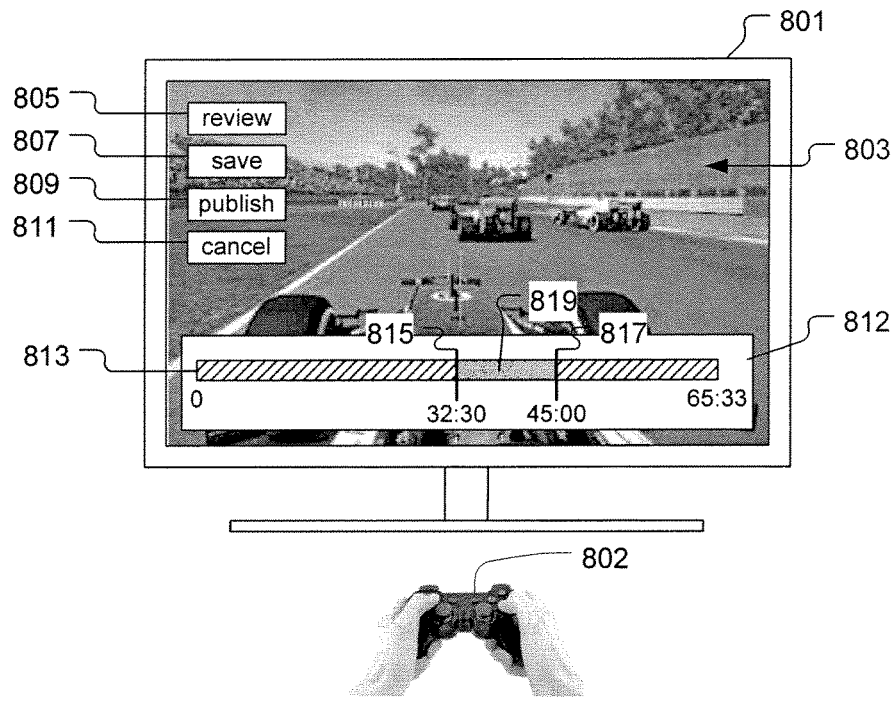
FIG. 9 shows an example of the miniapp generation mode including a set of miniapp generation GUI controls that may be shown on the user's display, in accordance with one embodiment of the present invention.

Upon activation of the miniapp generation GUI button 805, the miniapp generation logic 2001 functions to enter a miniapp generation mode to provide a set of miniapp generation GUI controls as video overlay on the user's display 801. FIG. 9 shows an example of the miniapp generation mode including a set of miniapp generation GUI controls that may be shown on the user's display 801, in accordance with one embodiment of the present invention. The set of miniapp generation GUI controls include a miniapp generation bar 812 which shows a timeline 813 of an entirety of the video game execution that has elapsed, i.e., from 0 to 65:33 in the example of FIG. 9. The miniapp generation bar 812 also includes a miniapp start marker 815, a miniapp end marker 817, and a miniapp duration marker 819, where the miniapp duration marker 819 is a modified segment of the timeline 813 extending between the miniapp start marker 815 and the miniapp end marker 817.

In one embodiment, the miniapp duration marker 819 is of fixed length and can be dragged along the timeline 813 by the user dragging either the miniapp start marker 815, the miniapp end marker 817, or the miniapp duration marker 819 along the timeline 813. In this embodiment, dragging of the miniapp start marker 815 will result in a corresponding movement of the miniapp duration marker 819 and miniapp end marker 817. Also, in this embodiment, dragging of the miniapp duration marker 819 will result in a corresponding movement of the miniapp start marker 815 and miniapp end marker 817. Also, in this embodiment, dragging of the miniapp end marker 817 will result in a corresponding movement of the miniapp duration marker 819 and miniapp start marker 815. It should be understood that the maximum allowable duration of the miniapp may be fixed by the computer application provider based on many different factors, such as economic performance and consumption of computing resources, among others.

Also, in some embodiments, the miniapp start marker 815 and/or the miniapp end marker 817 can be moved toward each other by the user to reduce the duration of the miniapp as represented by the miniapp duration marker 819. In some embodiments, the miniapp generation logic 2001 may enforce a minimum required miniapp duration so as to ensure that a generated miniapp includes some amount of meaningful content. Also, in some embodiments, the miniapp start marker 815 and/or the miniapp end marker 817 can be moved away from each other by the user to increase the duration of the miniapp as represented by the miniapp duration marker 819. In some embodiments, the miniapp generation logic 2001 may enforce a maximum allowed miniapp duration. The maximum allowed miniapp duration may be specified to ensure that a generated miniapp does not consume too many computing resources or to ensure that a value of the video game from which the miniapp is generated is not diminished.

Figure 10:
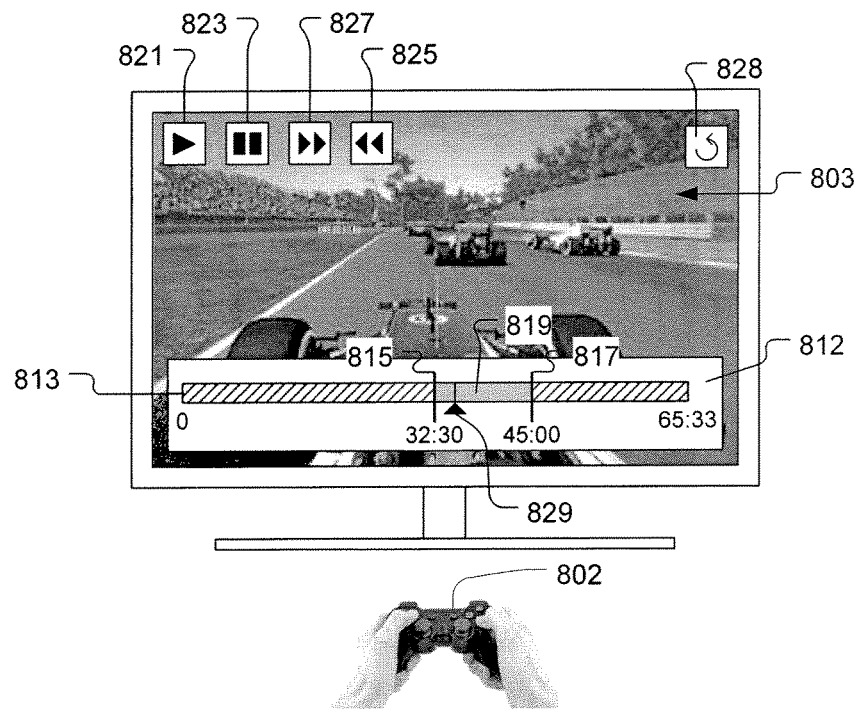
FIG. 10 shows a miniapp review mode initiated upon user activation of the review button, in accordance with one embodiment of the present invention.

The set of miniapp generation GUI controls can include a review button 805 which upon activation by the user will allow the user to review the miniapp as specified by the miniapp generation bar 812. FIG. 10 shows a miniapp review mode initiated upon user activation of the review button 805, in accordance with one embodiment of the present invention. The miniapp review mode provides for review of the user's execution of the video game corresponding to the miniapp as specified by the miniapp generation bar 812, based on user input signals recorded during the portion of the video game corresponding to the miniapp duration.

FIG. 10 shows an example set of miniapp review GUI controls that may be shown on the user's display 801, in accordance with one embodiment of the present invention. In some embodiments, the set of miniapp review GUI controls can include the miniapp generation bar 812 with a current execution state marker 829 shown thereon to indicate a temporal position within the execution of the miniapp. In one embodiment, the miniapp start marker 815, miniapp end marker 817, and miniapp duration marker 819 are inactive within the miniapp generation bar 812 during the miniapp review process. In another embodiment, the miniapp start marker 815, miniapp end marker 817, and miniapp duration marker 819 are active within the miniapp generation bar 812 during the miniapp review process, thereby allowing adjustment of the miniapp temporal specification during the review process.

The set of miniapp review GUI controls also includes a play button 821 which upon activation will run the miniapp from a current execution state as indicated by the current execution state marker 829. The set of miniapp review GUI controls also includes a pause button 823 which upon activation will stop execution of the miniapp at the current execution state as indicated by the current execution state marker 829. The set of miniapp review GUI controls can also include a rewind button 825 to move the execution of the miniapp to a prior execution state relative to the current execution state as indicated by the current execution state marker 829. The set of miniapp review GUI controls can also include a forward button 827 to move the execution of the miniapp to an advanced execution state relative to the current execution state as indicated by the current execution state marker 829. Also, in some embodiments, the current execution state of the miniapp can be changed by the user's dragging of the current execution state marker 829 along the timeline 813. Also, the set of miniapp review GUI controls includes a return button 828 which upon activation will return the user from the miniapp review mode back to the miniapp generation mode as shown in FIG. 9.

Figure 11:
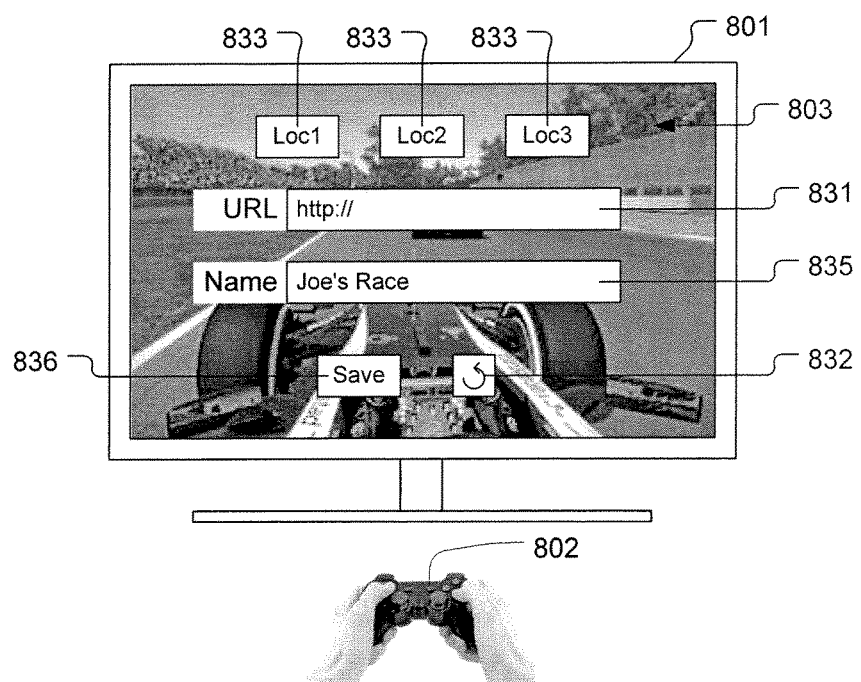
FIG. 11 shows an example set of miniapp saving GUI controls that may be shown on the user's display, in accordance with one embodiment of the present invention.

The set of miniapp generation GUI controls in the miniapp generation mode of FIG. 9 also includes a save button 807 which upon activation allows the user to save the miniapp as specified by the miniapp generation bar 812 at a storage location of the user's choosing. FIG. 11 shows an example set of miniapp saving GUI controls that may be shown on the user's display 801, in accordance with one embodiment of the present invention. The user may select a data storage location 833 from a list of data storage locations at which to store the data associated with the miniapp as specified by the miniapp generation bar 812. The data storage locations 833 may be specified by the user or specified based on a configuration of the user's computing system. In some embodiments, the user may be provided with a data entry field 831 through which the user can specify a URL (universal resource location) at which to store the data associated with the miniapp as specified by the miniapp generation bar 812. Also, the user may be provided with a miniapp name field 835 through which the user can specify a name for the miniapp. A save button 836 is also provided which upon activation will cause the miniapp data to be saved at the specified data storage location. In some embodiments, the save button 836 may not become activatable until a data storage location is selected/entered.

Storage of the miniapp includes storage of data specifying one or more portions of the program instructions of the video game that are required to execute the miniapp portion of the video game. The one or more specified portions of the program instructions of the video game corresponding to the miniapp may be continuous segments of program instructions or may by separate segments of program instruction. Also, storage of the miniapp includes storage of the user's input signals as recorded during the user's execution of the video game corresponding to the miniapp. Also, storage of the miniapp can include data defining an initial execution state of the miniapp. It should be understood that storage of the miniapp includes identification of any program instructions and application state data necessary to 1) execute the portion of the video game corresponding to the miniapp, and 2) recreate the user's recorded execution of the portion of the video game corresponding to the miniapp. Also, the set of miniapp saving GUI controls includes a return button 832 which upon activation will return the user from the miniapp saving mode back to the miniapp generation mode as shown in FIG. 9 in one embodiment, or will return the user back the video game state at which the miniapp generation mode was initially entered in another embodiment.

In various embodiments, the program instructions corresponding to the miniapp can be specified in a binary format as machine executable code, in a pre-compiled source code format, in an interpretable source code format, and/or any combination thereof, and/or other type of computer executable code format. Also, in some embodiments, metadata can be used to identify portions of program instructions necessary for use in defining the miniapp. The metadata may be code markers or any other type of flag embedded within the program instructions of the video game. The metadata can be embedded within machine executable code, within pre-compiled source code, within interpretable source code, and/or any combination thereof. In such embodiments, the metadata may be used and stored to specify the one or more portions of the program instructions of the video game that are required to execute the miniapp portion of the video game. In some embodiments, the metadata can be used to identify all code that is necessary (i.e., used, executed, and/or referenced, etc.) to generate the full state of the video game corresponding to the miniapp.

The set of miniapp generation GUI controls in the miniapp generation mode of FIG. 9 also includes a publish button 809 which upon activation allows the user to publish the miniapp as specified by the miniapp generation bar 812 to a web site, e.g., social media web site, of the user's choosing. In some embodiments, the publish button 809 may not become activatable until the miniapp is saved to a data storage location. With reference to FIG. 7, the miniapp module 2000 includes miniapp publication logic 2003 defined to provide for publication of a generated miniapp to a web site.

Figure 12:
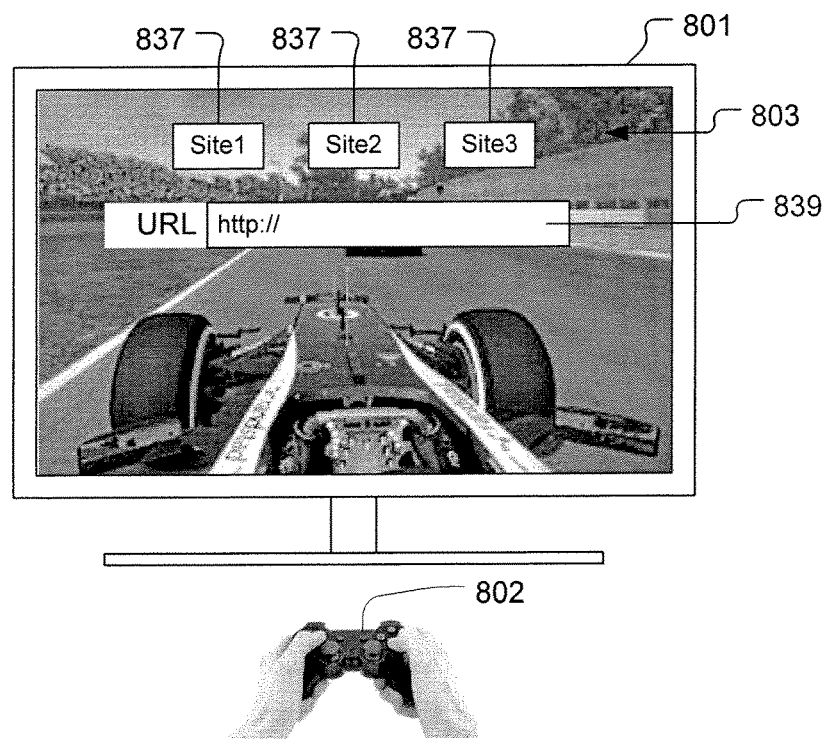
FIG. 12 shows an example set of miniapp publishing GUI controls that may be shown on the user's display, in accordance with one embodiment of the present invention.

FIG. 12 shows an example set of miniapp publishing GUI controls that may be shown on the user's display 801, in accordance with one embodiment of the present invention. The user may select a web site 837 from a list of web sites at which to publish the miniapp. The web sites 837 may be specified by the user or specified based on a configuration of the user's computing system. In some embodiments, the user may be provided with a data entry field 839 through which the user can specify a URL (universal resource location) corresponding to a web site at which to publish the miniapp as specified by the miniapp generation bar 812.

Figure 13:
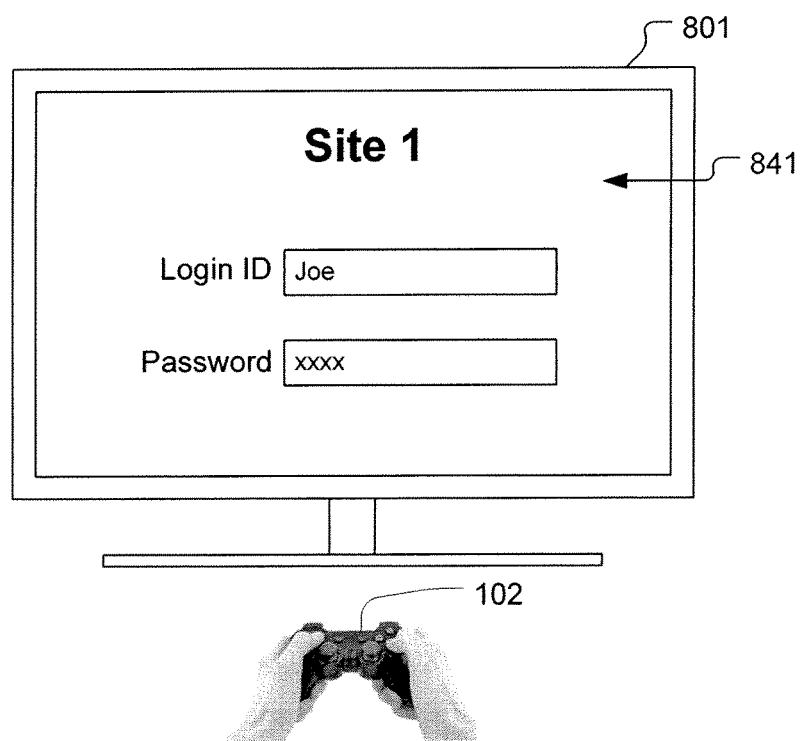
FIG. 13 shows a display image including data fields through which the user can enter their login credentials for the selected web site, in accordance with one embodiment of the present invention.
Figure 14:
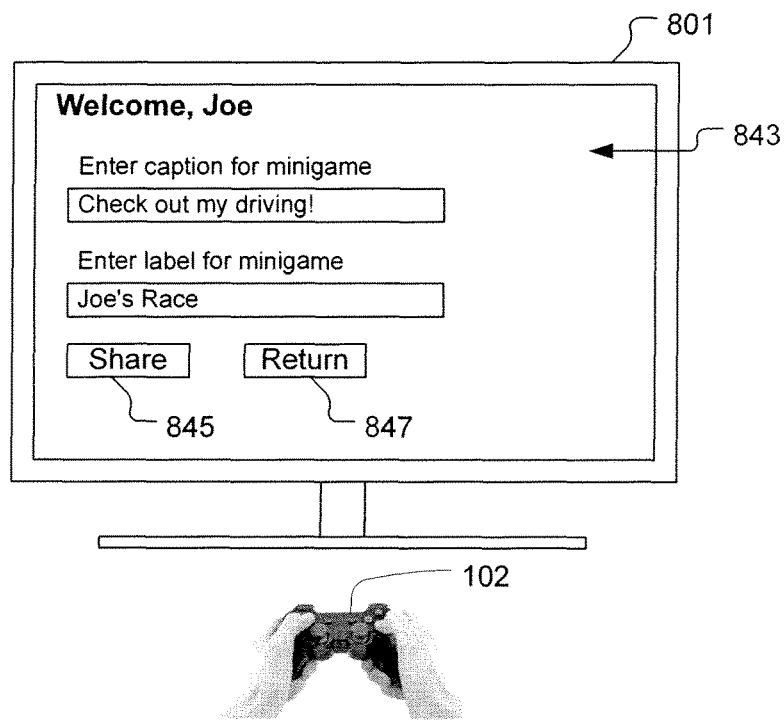
FIG. 14 shows a miniapp publication display image rendered upon the user's display upon the user successfully logging in to the selected web site, in accordance with one embodiment of the present invention.

The web sites at which the miniapp may be published can include social media web sites, such as Facebook by way of example, among other types of web sites. A user may choose to publish their miniapp on a social media web site to facilitate sharing of the miniapp to online acquaintances. Upon selecting a web site at which to publish the miniapp, the user can be prompted to enter their credentials for the selected web site. For example, FIG. 13 shows a display image 841 including data fields through which the user can enter their login credentials (Login ID and Password) for the selected web site (Site 1), in accordance with one embodiment of the present invention. FIG. 14 shows a miniapp publication display image 843 rendered upon the user's display upon the user successfully logging in to the selected web site, in accordance with one embodiment of the present invention. The miniapp publication display image 843 includes a data field through which the user can provide a caption for their miniapp and a label to be placed near the icon for their miniapp. The display image 843 also includes a share GUI button 845 which upon activation will publish the user's miniapp to their personal page of the selected web site and will return the user from the miniapp publishing mode back to the video game state at which the miniapp generation mode was initially entered. The display image 843 also includes a return GUI button 847 which upon activation will return the user from the miniapp publishing mode back to the video game state at which the miniapp generation mode was initially entered.

Figure 15:
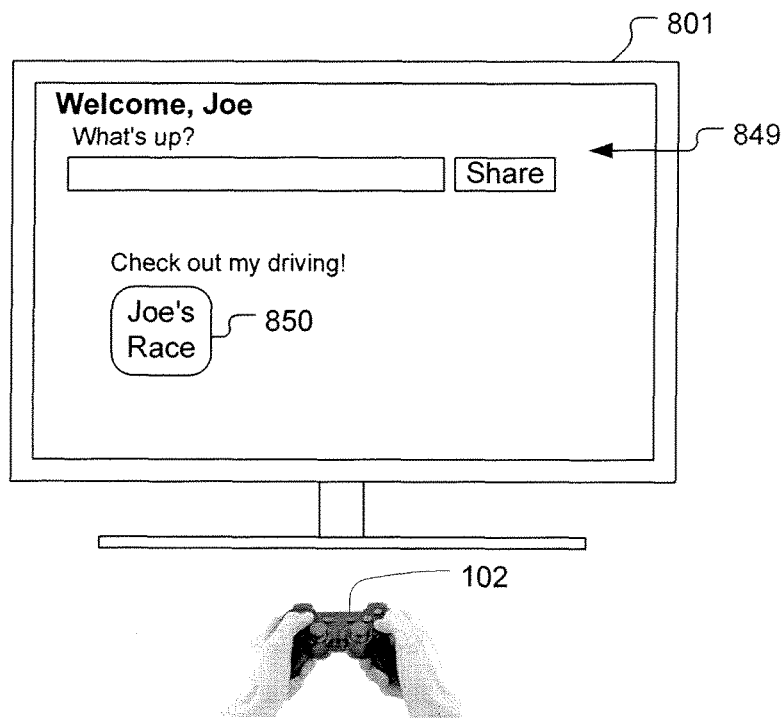
FIG. 15 shows a display image of a user's social media web page having the user's miniapp published thereon as icon, in accordance with one embodiment of the present invention.

FIG. 15 shows a display image 849 of a user's social media web page having the user's miniapp published thereon as icon 850, i.e., link, in accordance with one embodiment of the present invention. Upon activation of the icon 850, the corresponding miniapp is executed on the user's terminal to show the user's previous execution of the video game portion corresponding to the miniapp as directed by the recorded user input signals. With reference to FIG. 7, the miniapp module 2000 includes miniapp execution logic 2005 defined to provide for execution of a saved miniapp. The miniapp execution logic 2005 directs the provisioning of computing resources on the cloud computing system 600 as necessary to provide for execution of the saved miniapp on a user computing terminal.

Figure 16:
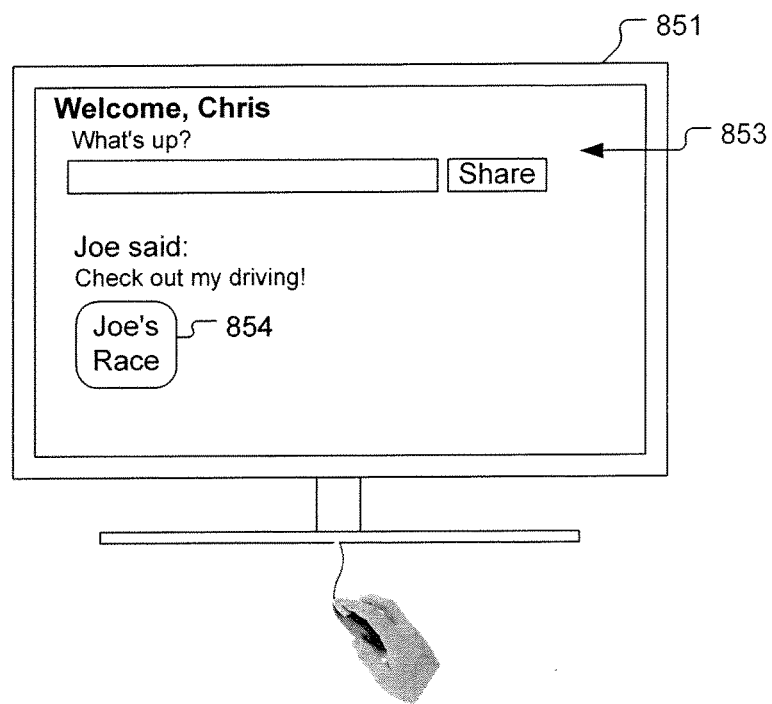
FIG. 16 shows a display image of a second user's social media web page upon which the first user's published miniapp is accessible as icon, in accordance with one embodiment of the present invention.

FIG. 16 shows a display image 853 of a second user's social media web page upon which the first user's published miniapp is accessible as icon 854, i.e., link, in accordance with one embodiment of the present invention. In one embodiment, upon activation of the icon 854 by the second user, the corresponding miniapp is executed on the second user's terminal to show the first user's previous execution of the video game portion corresponding to the miniapp as directed by the recorded user input signals. In another embodiment, upon activation of the icon 854 by the second user, a recorded video sequence is displayed on the second user's terminal to show the first user's previous execution of the video game portion corresponding to the miniapp.

Figure 17:
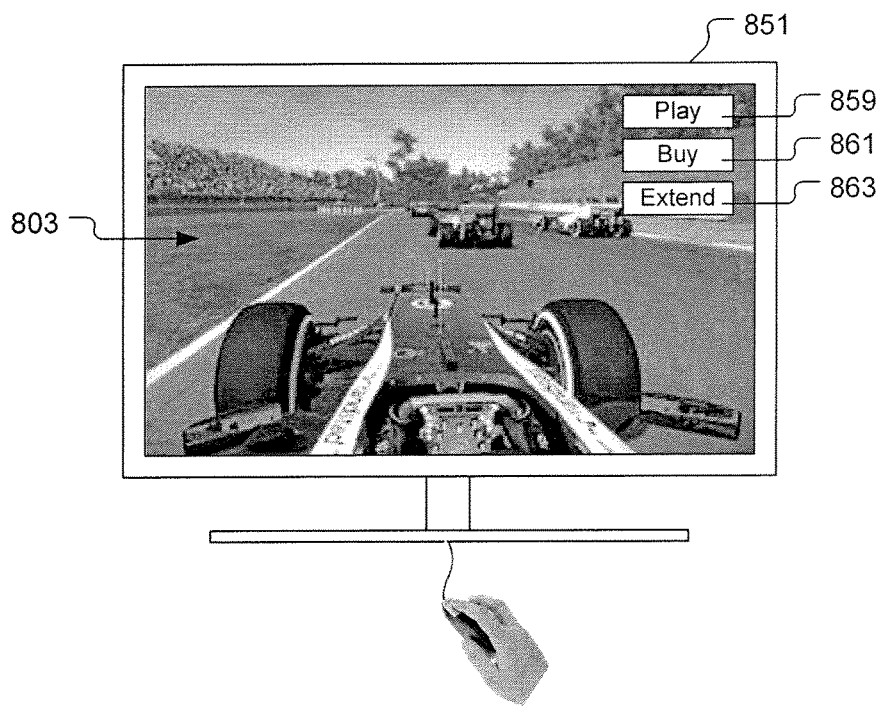
FIG. 17 shows the first user's published miniapp executing on the second user's display based on the recorded user input signals of the first user, in accordance with one embodiment of the present invention.
Figure 18:
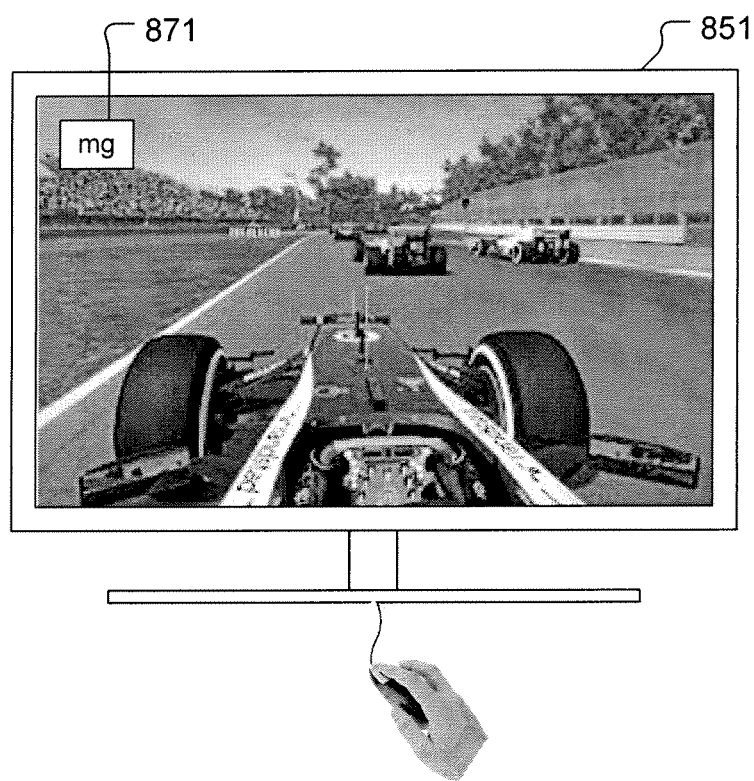
FIG. 18 shows the second user playing the miniapp generated by the first user, in accordance with one embodiment of the present invention.

FIG. 17 shows the first user's published miniapp 803 executing on the second user's display 851 based on the recorded user input signals of the first user, in accordance with one embodiment of the present invention. The second user's display 851 also shows a play button 859 which upon execution will allow the second user to play the miniapp portion of the video game in accordance with new user input signals provided by the second user. FIG. 18 shows the second user playing the miniapp generated by the first user, in accordance with one embodiment of the present invention. The second user is also provided with a miniapp generation button 871 which upon activation allows the second user to generate a new miniapp corresponding the original miniapp generated by the first user, but with the second user's input signals used to control execution of the new miniapp instead of the first user's input signals. The second user can also be provided with miniapp saving and/or publishing capability, such as that discussed above with regard to the save button 807 and the publish button 809, as discussed with regard to FIG. 9.

And, in some embodiments, the second user's display 851 includes a buy button 861 which will allow the second user to purchase the entire video game from which the miniapp is generated. And, in some embodiments, the second user's display 851 includes an extend button 863 which will allow the second user to purchase an extended version of the miniapp. The extended version of the miniapp includes the original portion of the video game corresponding to the miniapp and an additional amount of the video game either prior to the miniapp portion, after the miniapp portion, or both prior to and after the miniapp portion. In some embodiments, various extension options and associated purchase prices can be displayed to the second user for consideration and selection.

Additionally, with reference back to FIG. 9, the set of miniapp generation GUI controls in the miniapp generation mode also includes a cancel button 811 which upon activation will return the user from the miniapp generation mode back to the video game state at which the miniapp generation mode was initially entered.

Figure 19:
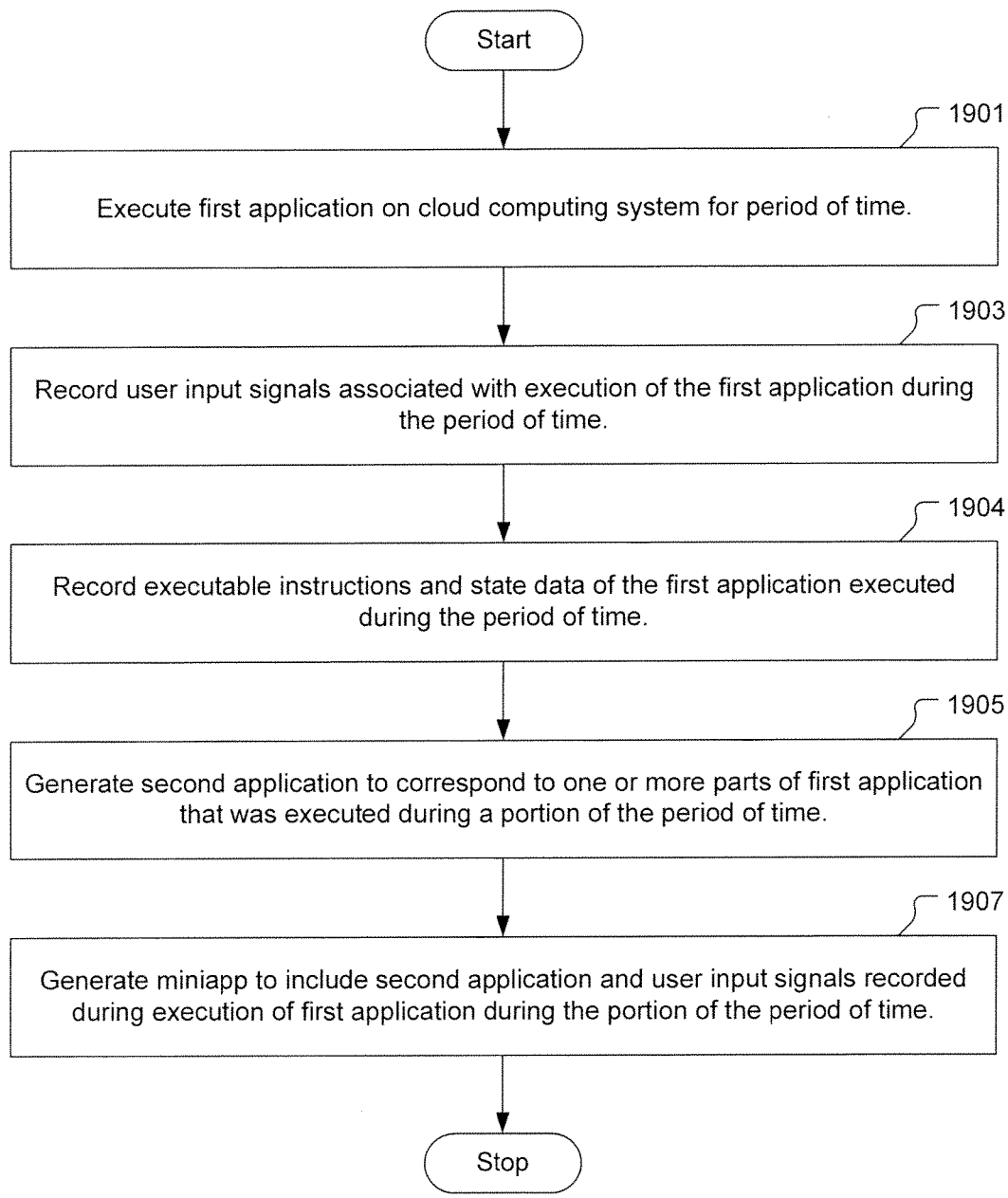
FIG. 19 shows a flowchart of a method for generating a miniapp, in accordance with one embodiment of the present invention.

FIG. 19 shows a flowchart of a method for generating a miniapp, in accordance with one embodiment of the present invention. The method includes an operation 1901 for executing a first application on a cloud computing system for a period of time. The method also includes an operation 1903 for recording user input signals associated with execution of the first application during the period of time. The method also includes an operation 1904 for recording executable instructions and state data of the first application executed during the period of time. The method also includes an operation 1905 for generating a second application to correspond to one or more parts of the first application that was executed during a portion of the period of time. The second application is defined by executable instructions and state data of the first application as recorded during the portion of the period of time. The method also includes an operation 1907 for generating a miniapp to include the second application and the user input signals recorded during execution of the first application during the portion of the period of time.

It should be understood that the method of FIG. 19 includes transmitting a video stream of the first application to a client computer system from the cloud computing system. In one embodiment, the method includes rendering a miniapp generation control as an overlay image within the video stream of the first application. Also, in this embodiment, the method includes transmitting a set of miniapp generation controls as one or more overlay images within the video stream upon activation of the miniapp generation control.

The set of miniapp generation controls includes a miniapp generation bar for selecting the second period of time within the first period of time, such as the miniapp generation bar 812 discussed with regard to FIG. 9. Also, the set of miniapp generation controls can include a review control to initiate auto execution of the second application based on the user input signals recorded during execution of the first application during the period of time, such as the review control 805 discussed with regard to FIG. 9. It should be understood that the auto execution of the second application includes transmission of a video stream of the second application auto execution to the client computer system from the cloud computing system. Also, the set of miniapp generation controls can include a save control to direct storage of the generated miniapp to a designated data storage location, such as the save control 807 discussed with regard to FIG. 9. In one embodiment, the designated data storage location is within the cloud computing system. Also, in one embodiment, the designated data storage location is specified by a universal resource locator received through the client computer system.

Additionally, the set of miniapp generation controls can include a publish control to direct publication of a link to the generated miniapp on a web site, such as the publish control 809 discussed with regard to FIG. 9. In one embodiment, the web site to which the miniapp is published is a social media web site. In one embodiment, activation of the published link within the web site initiates auto execution of the second application based on the user input signals recorded during execution of the first application during the period of time. The auto execution of the second application includes transmission of a video stream of the second application auto execution to a second client computer system upon which the web site is rendered. The video stream of the second application auto execution is effectively a video playback of the execution of the second application by the generator of the miniapp. In another embodiment, activation of the published link within the web site initiates display on the second client computer system of a recorded video playback of the miniapp generator's execution of the first application during the period of time.

The method can also include provision of a play control, such as play control 859 discussed with regard to FIG. 17, as an overlay image within the video stream of the second application auto execution as transmitted to the second client computer system upon which the web site is rendered. Activation of the play control directs execution of the second application based on new user input signals received through the second client computer system upon which the web site is rendered, such as discussed with regard to FIG. 18. The method can also include provision of a save control as an overlay image within the video stream transmitted to the second client computer system to direct storage of the new user input signals recorded during execution of the second application. Additionally, the method can include providing a publish control as an overlay image within the video stream transmitted to the second client computer system to direct publication of a link to the miniapp based on the new user input signals.

In some embodiments, the method can include providing a buy control as an overlay image within the video stream transmitted to the second client computer system to enable purchase and download of the first application from the cloud computing system, such as the buy control 861 discussed with regard to FIG. 17. In one embodiment, the buy control can provide for purchase and download of an entirety of the first application from the cloud computing system. However, in other embodiments, the buy control can provide for purchase and download of a specified portion of the first application from the cloud computing system. The specified portion may be based on an extension of the second application constituting the published miniapp, such that the extension includes more of the first application from which the second application is derived. And, the extension of the second application may be indexed to specified delineators within the execution of the first application, such as game level or game milestones. In some embodiments, the user purchasing the extension may be given one or options on how the extension is defined along with commensurate purchase pricing.

Figure 20:
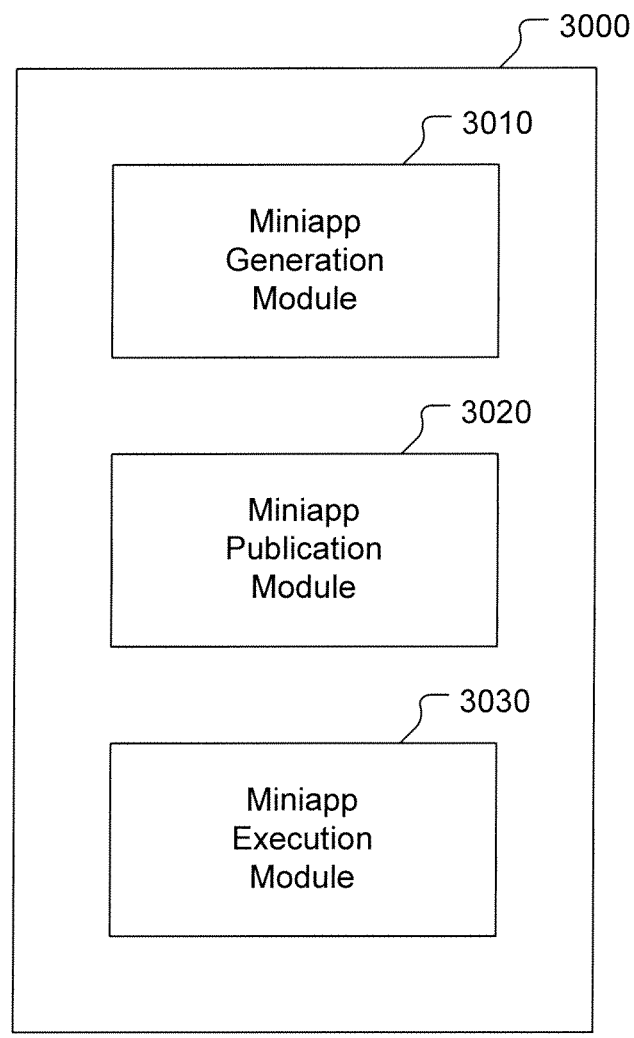
FIG. 20 shows a block diagram of a miniapp system, in accordance with one embodiment of the present invention.

FIG. 20 shows a block diagram of a miniapp system 3000, in accordance with one embodiment of the present invention. The miniapp system 3000 is defined to implement the functionality discussed with regard to the miniapp module 2000 of FIG. 7. The miniapp system 3000 includes a miniapp generation module 3010 defined to generate a miniapp as 1) a subset of program instructions of a first application, and 2) a set of user input signals and application state data received during execution of the subset of program instructions of the first application. The miniapp generation module 3010 is defined to implement the miniapp generation logic 2001 discussed with regard to FIG. 7. The miniapp system 3000 includes a miniapp publication module 3020 defined to provide for publication of a link to the miniapp, which upon activation will initiate auto execution of the subset of program instructions of the first application based upon the set of user input signals within the miniapp. The miniapp publication module 3020 is defined to implement the miniapp publication logic 2003 discussed with regard to FIG. 7.

Also, the miniapp system 3000 includes a miniapp execution module 3030 defined to provide for execution of the subset of program instructions of the first application based upon a new set of user input signals. The miniapp execution module 3030 is defined to implement the miniapp execution logic 2005 discussed with regard to FIG. 7. The miniapp execution module is defined to direct storage of the new set of user input signals recorded during execution of the subset of program instructions of the first application. In some embodiments, the miniapp execution module 3030 is defined to provide for purchase of full access to the first application as served by the cloud computing system.

With regard to the miniapp system 3000, it should be understood that the first application is served by a cloud computing system to a client computing system. Also, in one embodiment, each of the miniapp generation module, the miniapp publication module, and the miniapp execution module are served by the cloud computing system to the client computing system.

The embodiments disclosed herein relate to systems and method for cloud processing of applications and streaming of video frames of the cloud processing to a remote client. The cloud processing can include applications that process and output video frames of a first application (e.g., a video game) to examine the image content, and based on the examination, overlay content can be integrated into video frames being transferred to the remote client. In one embodiment, the overlay content can be merged with existing image content being output by the first application. The merging can be processed in various ways, and without limitation, merging can include replacing pixels in specific frames or sets of frames, tracking detected image objects and replacing pixels for the detected image objects as they move from frame to frame or over time.

In some examples, the overlay process is optimized so that the video frames received by the user of the client device will not detect that overlay processing was performed (e.g., on the client's display), and the output looks as if the native application (e.g., first application) produced the frames. In various examples, the first application can be a video game application. In a system that allows for online web play, a user with an account may be provided with a large library of video games to choose from, which can be thought of as first applications. In this context, many users can be provided with accounts and many users can select games and play simultaneously, either alone or in multi-player mode with friends of a social network. During the remote execution of first applications, one or more remotely executed applications examine and process the video frames that are the output of the first applications. These remotely executed applications perform the overlay process and can sync with game play to provide a new experience that was not originally part a native application.

As discussed herein, the servers that process the applications remotely may be referred to as cloud processing systems. The cloud processing systems can utilize many servers, which may use virtualization hardware and software, and the cloud processing systems may be distributed among more than one data center. Well placed data centers allow for reduced delay in streaming by their geographic distributed. In some embodiments, load balancing may be used to reduce delay and improve the performance of the remote game play.

Several embodiments are specifically illustrated and/or described herein. However, it will be appreciated that modifications and variations are covered by the above teachings and within the scope of the appended claims without departing from the spirit and intended scope thereof. For example, while the examples provided herein are directed to video games, the systems and methods discussed can be applied to other interactive video systems. While the examples provided herein are primarily directed at the delivery of video, the systems and method described herein can be applied to the generation of audio frames and delivery of audio streams. In some embodiments, audio and video streams are generated and delivered together as part of an audio-video stream.

The embodiments discussed herein are illustrative of the present invention. As these embodiments of the present invention are described with reference to illustrations, various modifications or adaptations of the methods and or specific structures described herein may become apparent to those skilled in the art. All such modifications, adaptations, or variations that rely upon the teachings of the present invention, and through which these teachings have advanced the art, are considered to be within the spirit and scope of the present invention. Hence, the descriptions and drawings provided herein should not be considered in a limiting sense, as it is understood that the present invention is in no way limited to only the embodiments illustrated herein.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps.

A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. The logic discussed herein may include hardware, firmware and/or software stored on a computer readable medium. This logic may be implemented in an electronic device to produce a special purpose computing system.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a non-transitory computer readable medium. The non-transitory computer readable medium is any data storage device that can store data, which can be thereafter be read by a computer system. Examples of the non-transitory computer readable medium include hard drives, network attached storage (NAS), read-only memory, random-access memory, CD-ROMs, CD-Rs, CD-RWs, magnetic tapes and other optical and non-optical data storage devices. The non-transitory computer readable medium can include computer readable tangible media distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the method operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating a miniapp, comprising:
    executing a computer application on a cloud computing system in accordance with input signals received over a network from a user of the computer application;
    receiving an input signal over the network to begin generation of a miniapp corresponding to an independently executable portion of the computer application;
    upon receipt of the input signal to begin generation of the miniapp, determining which portions of executable code of the computer application are required to create the miniapp and assembling metadata to identify the portions of executable code of the computer application required to create the miniapp; and
    publishing a link to the miniapp on a web site.

2. The method for generating the miniapp as recited in claim 1, further comprising:
    recording input signals received over the network from the user during execution of the portions of executable code of the computer application required to create the miniapp; and
    recording state data of the computer application at a time of creation of the miniapp.

3. The method for generating the miniapp as recited in claim 2, further comprising:
    receiving a signal over the network to initiate execution of the miniapp;
    processing the metadata to determine which portions of executable code of the computer application are to be executed in order to execute the miniapp; and
    executing the portions of executable code of the computer application as indicated by the metadata so as to execute the miniapp.

4. The method for generating the miniapp as recited in claim 3, wherein executing the portions of executable code of the computer application as indicated by the metadata so as to execute the miniapp is done in accordance with the recorded input signals received over the network from the user and the state data of the computer application at the time of creation of the miniapp.

5. The method for generating the miniapp as recited in claim 3, wherein executing the portions of executable code of the computer application as indicated by the metadata so as to execute the miniapp is done in accordance with new input signals received over the network during execution of the miniapp and with the state data of the computer application at the time of creation of the miniapp.

6. The method for generating the miniapp as recited in claim 2,
    wherein activation of the link to the miniapp initiates auto execution of the portions of executable code of the computer application as indicated by the metadata in accordance with the recorded input signals received over the network from the user and the state data of the computer application at the time of creation of the miniapp.

7. The method for generating the miniapp as recited in claim 2, further comprising:
    transmitting a set of miniapp generation controls as an overlay image within a video stream of the computer application over the network to a computer system of the user.

8. The method for generating the miniapp as recited in claim 7, wherein the set of miniapp generation controls includes controls for selecting a start time for the miniapp and a stop time for the miniapp, the start time and stop time corresponding to respective times during execution of the computer application.

9. The method for generating the miniapp as recited in claim 8, wherein the set of miniapp generation controls includes controls for playing back the miniapp from the start time to the stop time using the recorded input signals received over the network from the user and the state data of the computer application at the time of creation of the miniapp.

10. The method for generating the miniapp as recited in claim 9, wherein the set of miniapp generation controls includes a control for publishing the link to the miniapp on the web site.

11. A computer memory including executable instructions for a miniapp generation module, comprising:
    miniapp generation logic defined to receive an input signal over a network to begin generation of a miniapp, the miniapp corresponding to a portion of a computer application, the miniapp being executable independent from execution of the computer application,
    the miniapp generation logic defined to determine which portions of executable code of the computer application are required to create the miniapp upon receipt of the input signal to begin generation of the miniapp, the miniapp generation logic defined to assemble metadata to identify the portions of executable code of the computer application required to create the miniapp, and
    the miniapp generation logic defined to publish a link to the miniapp on a web site.

12. The computer memory as recited in claim 11, wherein the miniapp generation logic is defined to record input signals received over the network from the user during execution of the portions of executable code of the computer application required to create the miniapp, and wherein the miniapp generation logic is defined to record state data of the computer application at a time of creation of the miniapp.

13. The computer memory as recited in claim 12, wherein the miniapp generation logic is defined to receive a signal over the network to initiate execution of the miniapp, and process the metadata to determine which portions of executable code of the computer application are to be executed in order to execute the miniapp, and execute the portions of executable code of the computer application as indicated by the metadata so as to execute the miniapp.

14. The computer memory as recited in claim 13, wherein the miniapp generation logic is defined to execute the portions of executable code of the computer application as indicated by the metadata so as to execute the miniapp in accordance with the recorded input signals received over the network from the user and the state data of the computer application at the time of creation of the miniapp.

15. The computer memory as recited in claim 13, wherein the miniapp generation logic is defined to execute the portions of executable code of the computer application as indicated by the metadata so as to execute the miniapp in accordance with new input signals received over the network during execution of the miniapp and with the state data of the computer application at the time of creation of the miniapp.

16. The computer memory as recited in claim 12, wherein activation of the link to the miniapp initiates auto execution of the portions of executable code of the computer application as indicated by the metadata in accordance with the recorded input signals received over the network from the user and the state data of the computer application at the time of creation of the miniapp.

17. The computer memory as recited in claim 12, wherein the miniapp generation logic is defined to transmit a set of miniapp generation controls as an overlay image within a video stream of the computer application over the network to a computer system of the user.

18. The computer memory as recited in claim 17, wherein the set of miniapp generation controls includes controls for selecting a start time for the miniapp and a stop time for the miniapp, the start time and stop time corresponding to respective times during execution of the computer application.

19. The computer memory as recited in claim 18, wherein the set of miniapp generation controls includes controls for playing back the miniapp from the start time to the stop time using the recorded input signals received over the network from the user and the state data of the computer application at the time of creation of the miniapp.

20. The computer memory as recited in claim 19, wherein the set of miniapp generation controls includes a control for publishing the link to the miniapp on the web site.

* * * * *